US007169213B2

(12) United States Patent
Liu et al.

(10) Patent No.: US 7,169,213 B2
(45) Date of Patent: Jan. 30, 2007

(54) MULTI-CHANNEL CROSS-FLOW POROUS DEVICE

(75) Inventors: Wei Liu, Painted Post, NY (US); Jimmie L. Williams, Painted Post, NY (US); Yuming Xie, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 12 days.

(21) Appl. No.: 10/996,522

(22) Filed: Nov. 24, 2004

(65) Prior Publication Data

US 2006/0090651 A1    May 4, 2006

Related U.S. Application Data

(63) Continuation-in-part of application No. 10/978,126, filed on Oct. 29, 2004.

(51) Int. Cl.
*B01D 53/22*    (2006.01)
*B01D 46/00*    (2006.01)
*B01D 61/00*    (2006.01)

(52) U.S. Cl. .................. 96/4; 96/11; 96/12; 96/121; 55/495; 55/502; 55/523; 55/524; 210/490; 210/500.21; 210/500.25; 210/500.26; 210/500.27; 210/510.1; 210/650

(58) Field of Classification Search .............. 96/4, 96/11, 12, 121; 55/495, 502, 523, 524; 210/490, 210/500.24, 500.25, 500.26, 500.27, 510.1, 210/650
See application file for complete search history.

(56) References Cited

U.S. PATENT DOCUMENTS 4,222,874 A    9/1980  Connelly ................... 210/650
4,781,831 A    11/1988 Goldsmith .................. 210/247
4,865,630 A *  9/1989  Abe ............................. 96/11

(Continued)

FOREIGN PATENT DOCUMENTS

EP    0467735    1/1992

(Continued)

*Primary Examiner*—Jason M. Greene
(74) *Attorney, Agent, or Firm*—Juliana Agon; Gregory V. Bean; Ronald J. Paglierani

(57) ABSTRACT

A multi-channel modular device (10) processes between two fluid streams of different compositions. The device (10) includes a porous body (150) having a first plurality of feed-flow pathways (110) disposed in the body (150) for transporting a first stream (180). A pathway wall (114) surrounds each of the first plurality of feed-flow pathways (110) for processing the first stream (180) into a first composition (1852) and a second composition (1802). At least one feed-flow inlet (1101) is disposed in the body (150) for introducing the first stream (180) into the first plurality of feed-flow pathways (110). At least one feed-flow outlet (1102) is disposed in the body (150) for discharging the remaining first stream containing the second composition (1802). At least one second pathway (210) is disposed in the body (150) for transporting a second stream (280) having a second inlet (2101) and a second outlet (2102). A networked plurality of fluid conduits (152) formed in the porous body (150) provides the flow-conduit for the second stream (280) to sweep the first composition (1852) from each of the first plurality of the feed-flow pathways (110) to the second outlet (2102). A vessel (300) ports the inlets (1101 and 2101) and outlets (1102 and 2102) to provide a second stream flow access and for spacing the body within and away from the inner surfaces of the vessel (300) to provide a gap (310) for access. A partition (350) is disposed in the gap between the body and the vessel for diverting the flow within the gap (310).

23 Claims, 14 Drawing Sheets

U.S. PATENT DOCUMENTS

| | | | | |
|---|---|---|---|---|
| 5,009,781 A | 4/1991 | Goldsmith | ............... | 210/247 |
| 5,108,601 A | 4/1992 | Goldsmith | ............... | 210/247 |
| 5,139,540 A | 8/1992 | Najjar et al. | ............... | 96/11 |
| 5,149,340 A * | 9/1992 | Waycuilis | ............... | 96/11 |
| 5,415,772 A * | 5/1995 | Garcera et al. | ............... | 55/523 |
| 5,614,001 A * | 3/1997 | Kosaka et al. | ............... | 96/11 |
| 5,855,781 A | 1/1999 | Yorita et al. | ............... | 210/321.82 |
| 5,997,744 A | 12/1999 | Limaye | ............... | 210/650 |
| 6,004,383 A | 12/1999 | Kuhnelt | ............... | 96/8 |
| 6,056,796 A | 5/2000 | Chiang et al. | ............... | 55/302 |
| 6,077,436 A * | 6/2000 | Rajnik et al. | ............... | 96/4 |
| 6,126,833 A | 10/2000 | Stobbe et al. | ............... | 210/650 |
| 6,214,574 B1 | 4/2001 | Kopf | ............... | 435/41 |
| 6,228,147 B1 * | 5/2001 | Takahashi | ............... | 95/55 |
| 6,296,683 B1 | 10/2001 | Koch | ............... | 95/23 |
| 6,461,406 B1 * | 10/2002 | Sakai et al. | ............... | 96/11 |
| 6,540,818 B2 | 4/2003 | Hachimaki | ............... | 96/8 |
| 6,585,808 B2 | 7/2003 | Burban et al. | ............... | 96/8 |
| 6,616,735 B1 | 9/2003 | Burban et al. | ............... | 96/8 |
| 6,669,751 B1 | 12/2003 | Ohno et al. | ............... | 55/523 |
| 6,723,156 B2 | 4/2004 | Edlund et al. | ............... | 96/4 |
| 6,740,140 B2 | 5/2004 | Giglia et al. | ............... | 95/52 |
| 6,764,529 B2 | 7/2004 | Nichols et al. | ............... | 95/52 |
| 6,776,820 B2 | 8/2004 | Bikson et al. | ............... | 95/52 |
| 2003/0155290 A1 | 8/2003 | Chanaud | ............... | 210/321.6 |
| 2003/0183080 A1 * | 10/2003 | Mundschau | ............... | 96/4 |
| 2004/0175326 A1 | 9/2004 | Hershkowitz et al. | ............... | 423/652 |

FOREIGN PATENT DOCUMENTS

| | | | | |
|---|---|---|---|---|
| EP | 0780148 | 12/1996 | ............... | 29/52 |
| EP | 0787524 | 1/1997 | ............... | 63/6 |
| EP | 0787524 B1 | 8/2002 | | |
| FR | 2785831 | 11/1998 | ............... | 63/6 |
| WO | WO00/20105 | 4/2000 | | |

* cited by examiner

MULTI-CHANNEL CROSS-FLOW POROUS DEVICE

CROSS-REFERENCE TO RELATED APPLICATIONS

This is a continuation-in-part of U.S. patent application Ser. No. 10/978,126 filed on U.S. Parent Application Filing Date Oct. 29, 2004, the content of which is relied upon and incorporated herein by reference in its entirety, and the benefit of priority under 35 U.S.C. § 120 is hereby claimed.

BACKGROUND OF THE INVENTION

1. Field of the Invention

The present invention relates generally to processing between two fluid streams of different compositions, and particularly to a membrane module for separation, purification, mass transport, exchange, or other types of processing applications of process streams involving the use of a purging, sweep or any other type of a second fluid stream.

2. Technical Background

Cross-flow filtration is known where the permeate flow conduits are disposed perpendicular or transverse to the feed flow conduits. Purge flow to sweep the permeate flow conduit is also known for disk-shaped, single tube-shaped, or bundled tubular membranes, such as hollow fibers. However, known single or bundled ceramic hollow-fibers are too fragile to be of practical use. Hence, cross-flow filtration devices with a purge access are known but they are typically based on polymeric hollow-fibers. Known polymer-based hollow fiber membrane modules have the desired high separation surface area per unit volume and permeability for effective mass transfer or exchange between two kinds of fluid streams suitable for separation, filtration, and extraction processes. One fluid stream flows inside the hollow fiber, while another fluid stream flows around the hollow fiber.

A number of individual small hollow fiber tubes have been grouped together to form a bundle. The void space among the individual fibers in a bundle provides space large enough for the fluid to move around and provide purge flow access. A purge flow formed on the bundled hollow fibers has also been known to improve membrane performance of the bundled hollow-fibers arranged in a cross-flow pattern.

However, the main problems with polymer materials are their susceptibility to attack by organic solvents and their instability at high temperatures (e.g. >250° C.) and other harsh operating environments. The porous polymeric support is not suitable for supporting inorganic membrane materials.

Many adsorbent materials known in the field, such as zeolites, provide the selective adsorption function. Zeolite membrane has been an active technology area for recent ten years, because it has a large potential for a variety of application. The salient feature of zeolite membranes is a well-defined pore structure that makes it possible to achieve real molecular sieving effect. For example, diffusion rate of linear-shaped molecules in the zeolites crystal could be several orders of magnitude higher than that of the corresponding isomer in a branch-shaped form. However, inorganic zeolites can not be applied to the incompatible organic polymeric material.

In theory, the hollow fiber tubes individual, their membrane, or both can be made of ceramic oxides, instead of a polymeric material, to offer the same surface area advantage and eliminate the problems associated with the polymeric bundled fibers. Besides, the ceramic membrane may offer high selectivity and flux on the basis of unit separation area. Further, the ceramic membrane may be regenerated.

However, the ceramic hollow fibers could not be made with the required mechanical strength and flexibility in an economical way. The hollow-fiber ceramic tubes have a high surface area but are fairly brittle. The inorganic membranes have poor mechanical flexibility, low membrane surface area per unit module volume, difficulty in membrane processing and module assembly, and high capital costs.

It is known that by embedding cross-flow channels in a strong porous body, the cross-flow module offers a separation area comparable to the hollow-fiber but with greatly enhanced mechanical strength and can be made cost effective. However, the key problem is how to manage the flow into or out of the embedded membrane channels or tubes, when there is no open or free space available between the embedded tubes. As is known, the bundle of hollow fibers or a single channel offers a much larger open space among individual hollow fibers for the flow to go around than the multi-channels being embedded in a porous but solid matrix.

For the membrane module of simple structure, such as planar disks or single-channel tubes, the adsorption and purge operation can be readily performed in the space available.

The disk or single-channel membrane module is commonly used in the laboratory and in some industrial processes. However, the disk-shaped or single-channel tubular inorganic membrane module has a low separation surface area per unit volume. One way to increase the surface area is to have many smaller feed channels in one inorganic membrane body. Such a monolithic design presents a challenge in how to introduce the sweep flow stream for an efficient removal of the adsorbed or permeated species. In a multi-channel, monolithic membrane module, the permeate is driven from the inner channels to the outside of the module by a pressure differential. When a purge flow is introduced to the outside of the membrane module, the purge flow cannot get into the inner channels because of the opposite pressure resistance. As a result, only the outside of the module surface is "purged", while the permeate from the inner channels could not be reached.

Hence, as a general concept, using sweep flow for membrane separation is known. Using a monolith support is also known but the combination of an external sweep flow purge access in a monolith is not known. The challenge is how to conduct the purge of a membrane module with a number of flow channels being embedded in a solid but porous matrix. For a monolithic membrane module, the conventional purge method allows only for the sweep of the exterior-surface of the monolithic module only and the innermost membrane channels inside the matrix cannot be purged. How to purge every membrane channels in a monolith membrane support is the challenge.

Hence, there is a need to provide purge flow access in a low-cost and strong inorganic cross-flow filtration device having a high contacting area between two fluids, a high permeability through the membrane divider, long-term stability at high temperatures, ruggedness for operations under harsh environments, inertness toward the solvent attack, and resistance toward high pressure drops.

SUMMARY OF THE INVENTION

One aspect of the invention is a multi-channel modular device for processing between two fluid streams of different compositions. The device includes a porous body having a first plurality of feed-flow pathways disposed in the body for transporting a first or feed stream. A pathway wall surrounds each of the first plurality of feed-flow pathways for processing the feed stream into a first composition and a second composition. At least one feed-flow inlet is coupled to the body for introducing the feed stream into the first plurality of feed-flow pathways. At least one feed-flow outlet is disposed in the body for discharging the remaining feed stream containing the second composition. At least one second pathway is disposed in the body for transporting a second stream having a second inlet and a second outlet. A networked plurality of fluid conduits formed in the porous body provides the flow for the second stream to sweep the first composition from each of the first plurality of the feed-flow pathways to the second outlet. A vessel ports the inlets and outlets to provide a second stream flow access and for spacing the body within and away from the inner surfaces of the vessel to provide a gap for access. A partition is disposed in the gap between the body and the vessel for diverting flow within the gap.

In another aspect, the present invention includes a purge stream as the second stream.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 13 is a cut-away view of the partition 350 or 650 if the body was square 150C instead of rounded, according to the present invention; FIG. 14 is a cut-away view of the partition 650 if the body was square 150C instead of rounded, according to the present invention.

DETAILED DESCRIPTION OF THE PREFERRED EMBODIMENTS

Figure 1:
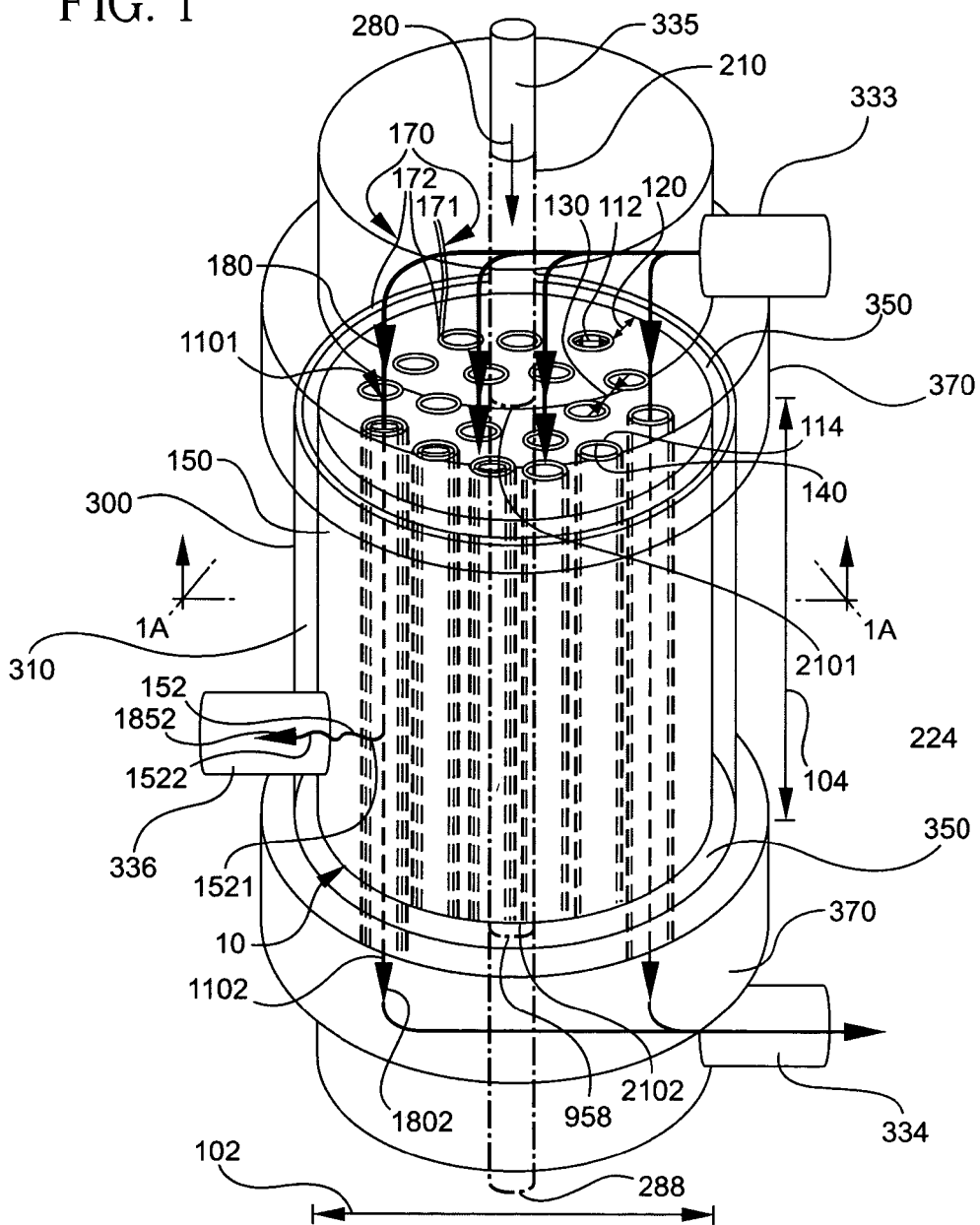
FIG. 1 is a perspective view of a radial-second stream flow embodiment of the present invention.

Reference will now be made in detail to the present preferred embodiments of the invention, examples of which are illustrated in the accompanying drawings. Whenever possible, the same or similar reference numerals will be used throughout the drawings to refer to the same or like parts. Even when not numbered in the drawing but referenced in the text, the same or similar parts or dimensions can always be seen in FIG. 1 or FIG. 1A. Note however that the drawings are not necessarily drawn to scale and not all flow arrows are shown for simplicity. One embodiment of the multi-channel modular device 10 for processing between two fluid streams of different compositions of the present invention is shown in FIG. 1, and is designated generally throughout by the reference numeral 10. The processing can be mass transfer or exchange between any two fluid streams, where the two fluid streams are a raw feed stream and a sweep stream, or any other two different fluid streams. In general, the first fluid or feed stream can be gas-phase or liquid-phase, liquid-liquid phase, gas/liquid phase, or liquid-solid phase, while the purge or sweep stream will be either liquid-phase or gas-phase. Hence, the inventive sweep-flow access device, as taught by the present invention, can be used for liquid-phase and gas-phase separation, in laboratory scale or in commercial scale, for extraction of a useful component out of a mixture or for removal of the impurity out of a mixture.

Figure 1A:
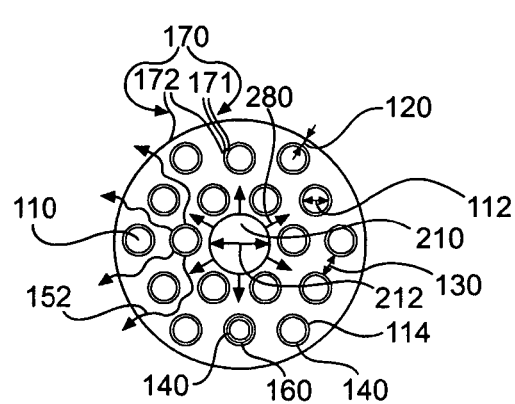
FIG. 1A is a cut-away view of cross-section 1A of the body 150 of FIG. 1, according to the present invention.

Referring to FIGS. 1 and 1A, the device or module 10 includes a porous inorganic body 150 having a first plurality of feed-flow pathways 110 disposed in the body 150 for transporting a first or feed stream 180. A pathway wall 114 surrounds each of the first plurality of feed-flow pathways 110 for processing the feed stream 180 into a first composition 1852 and a second composition 1802. At least one feed-flow inlet 1101 is disposed in the body 150 for introducing the feed stream 180 into the first plurality of feed-flow pathways 110. At least one feed-flow outlet 1102 is disposed in the body 150 for discharging the remaining feed stream containing the second composition 1802. At least one second or purge pathway 210 is disposed in the body 150 for transporting a second or sweep stream 280 having a second or purge inlet 2101 and a second or purge outlet 2102. A networked plurality of fluid conduits 152 formed in the porous body 150 provides the flow-conduit for the second or sweep stream 280 to sweep the first composition 1852 from each of the first plurality of the feed-flow pathways 110 to the second or purge outlet 2102. The effect of the second stream 280, for example, a sweep gas, is to vacuum out the permeate 1852 that seeps through the membrane 140 and the porous support or body 150 through the tortuous paths or interconnected pores 152. A vessel 300 ports the inlets 1101 and 2101 and outlets 1102 and 2102 to provide a second stream or purge flow access and for spacing the body within and away from the inner surfaces of the vessel 300 to provide a gap 310 for access. A partition 350 is disposed in the gap 310 between the body and the vessel for diverting flow within the gap 310.

The body 150 can be made of any suitable porous material, such as a metal or any other inorganic material. Preferably, the body 150 is a ceramic monolithic multi-channel matrix support having a module hydraulic diameter 102 in a range about 9 to 100 mm, an aspect ratio of the module hydraulic diameter 102 to a module length 104 greater than 1. The first plurality of feed-flow pathways or channels 110 are distributed in parallel over a module cross-section, the plurality of feed flow channels 110 having a size and shape defining a channel density in the range of about 50–800 channels/in$^2$ (7.8–124 channels/cm$^2$) in a module frontal area, a channel hydraulic diameter 112 in the range of about 0.5–3 mm, a rim distance 120 having a thickness greater than 1.0 mm (0.04 in), and a percent open frontal area (OFA) in the range of about 20–80% normalized to the feed area.

By definition, the average hydraulic diameter ($D_h$) is defined by the following formula:

$$D_h=4(\text{cross-sectional area/wetted perimeter}).$$

Thus, for a two-dimensional shape, the hydraulic diameter of is 4 times the surface area divided by the perimeter. For example, for a circle of diameter d, the hydraulic diameter $D_h=4[(\pi d^2/4)]/(\pi d)=d$. However, for a square of length L, hydraulic diameter $D_h=4 \times L^2/(4L)=L$. In general, a hydraulic diameter bears an inverse relationship to surface to volume ratio.

The module frontal area is the cross-sectional area of the module body that includes the solid matrix of porous material and channels. For example, for a cylindrical module of diameter d, the area is $\pi d^2/4$. The open frontal area fraction is then the ratio of overall open channel areas to the module area. For example, for a module of cross-sectional area of 10 cm$^2$, if the total channel area is 5 cm$^2$, then the open frontal area fraction is 5/10=0.5 where the open channel area is the sum of cross-sectional areas for all of the channels.

Preferably, the module hydraulic diameter 102 is in a range about 10 to 50 mm. The aspect ratio of the module hydraulic diameter 102 to a module length 104 is preferably greater than a range about 5–10.

Figure 12:
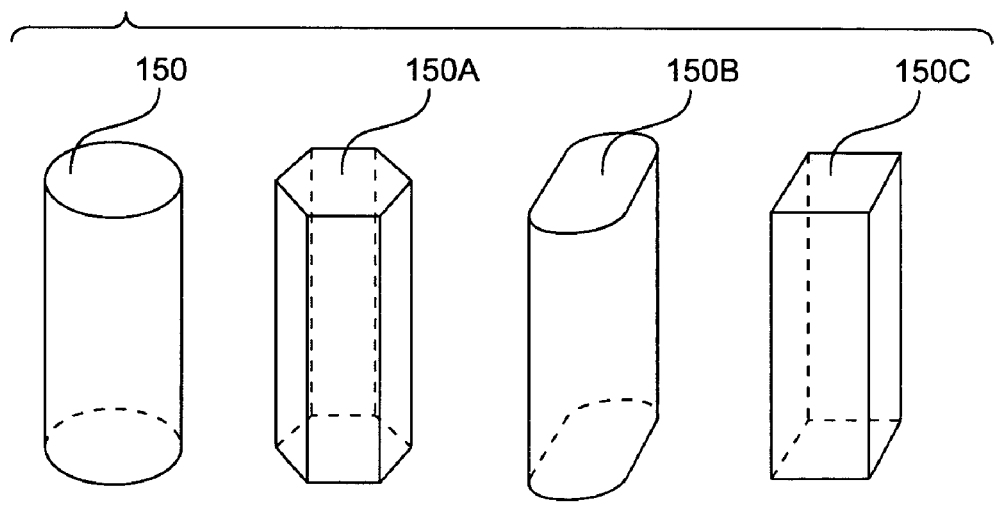
FIG. 12 is a representation of different body shapes for the body 150 of any of the previous embodiments, according to the present invention.

Referring to FIG. 12, possible shapes of the membrane module body 150 of the present invention are shown. Even though the body or module 150 is shown as a cylinder in FIG. 1, with a circular cross-section, the module 150 can be of any shape, such as an elongated cube, cut, elliptical or other arcuate volume 150B or other shaped monolith having a square, hexagonal 150A or rectangular 150C cross-section.

As long as the body 150 has a high aspect ratio (length/diameter), any possible shape is possible. For consistency and simplicity, the cylindrical form of the module body 150 will be used primarily in the subsequent discussions. However, the technical insights and know-how is applicable to the other forms of the membrane module body.

Referring back to FIGS. 1 and 1A, the plurality of feed flow channels 110 preferably has a channel density in the range of about 50–600 channels/in$^2$ (7.8–94 channels/cm$^2$) normalized to the module frontal feed flow area, a channel hydraulic diameter 112 in the range of about 0.5–2 mm, a web thickness between channel walls less than the rim distance 120 in a range about 0.2 to 5 mm (0.01 to 0.2 in), and a percent open frontal area (OFA) in a range about 30–60%, and specifically about 40%. The optimized module design thus offers a high separation surface area by using small-size flow channels 110 and a thin web thickness 130.

The at least one purge pathway 210 is preferably a single purge channel having a hydraulic diameter 212 in a range about 1 to 10 mm for maximum efficiency. The purge pathway or channel 210 is disposed in the center of the body 150 for introducing and radially distributing the sweep stream 280 from the purge inlet 2101 to the networked plurality of fluid conduits or tortuous paths comprising the interconnected pores 152 in the body 150 for sweeping the first composition 1852 from each of the first plurality of feed-flow pathways 110 to the exterior surface 1522 of the body 150 being discharged through the purge outlet 2102. Preferably, the interconnected pores 152 in the body has a porosity of about 20 to 80% and more than 20% of the pore volume has a pore size in the range of about 0.5 to 25 um. However, the pore size can be anywhere from about 0.5 nm to an even much greater size than 25 um.

The feed-flow pathways or feed channels 110 are distributed over the module cross-section symmetrically about the central purge pathway 210. It is preferred to have an adequate skin thickness (e.g., >1 mm or 0.04 inch) in the rim 120 greater than the web thickness 130. The skin or rim thickness 120 is an independent parameter from the web thickness 130. The web thickness 130 basically determines how far the channels 110 are located next to each other, while the skin or rim thickness 120 affects the overall module strength and permeability.

Hence, the present invention teaches a high-surface area, monolith-structured inorganic tubular or other shaped module having a porous body portion used by itself or for supporting a membrane that can be used for processing gas or liquids, such as hydrogen separation and/or purification.

As one example, the monolith-structured membrane module is in the shape of a module tube having a module hydraulic diameter 102 preferably in a range of about 10–30 mm. With this module hydraulic diameter 102, the module length 104 is substantially equal to the length of each of the plurality of feed flow channels 110 being in a range about 100–3000 mm for a high aspect ratio.

As the body portion 150, the ceramic monolithic matrix has a pore size in a range of about 1–30 μm and porosity in a range of about 20–80% to provide a macro-porous ceramic matrix having a plurality of tortuous flow paths or interconnected pores 152 through the interstices of the pores. Preferably, the pore sizes are in a range such that more than 20% of the total pore volume has a pore size in a range about 0.5 to 25 μm. In this way, the porosity is defined separately from the pore size. Thus, the substrate, body, or matrix 150 can have all kinds of pore sizes as long as a certain fraction of those pores are large enough to give a good permeability.

Thus by defining certain pore sizes, it is vital that the pores inside the matrix are interconnected to form pathways 152 for the first composition 1852, such as a permeate. The interconnected pore structure also provides mechanical strength for the module. A networked pore structure or interconnected pores means that pores are interconnected to each other to form the torturous paths 152. If there are a lot of pores inside the support matrix but they are not connected, the fluid cannot be pushed through and the support is not suitable for use by itself or for a membrane application. There is no good definition about the pore connectivity. However, the pore connectivity can be qualitatively analyzed by use of electron microscopy. Generally, if the pore size and porosity is large enough, the networked pore structure can be formed.

Pore size and porosity are numbers that can be quantified with accepted measurement methods and models. The pore size and porosity is typically measured by standardized techniques, such as mercury porosimetry and nitrogen adsorption. The pore size is calculated with well-accepted equations. There are all possible shapes for the pore opening. The calculated pore size is a number to characterize the opening (width) of these pores based on well-accepted model equations. However, there is not a good method to characterize the length of the pore.

"Connectivity" of those pores, although important is harder to quantify. However, for a material of the same pore size and porosity, connectivity is largely determined by the forming process of the membrane support. The substrate or body portion 150 may be prepared by using known casting or extrusion methods of inorganic materials as the backbone or substrate material. The forming process already known gives the connectivity, such as the same processing methods to form Corning Incorporated's diesel particulate filters, such as by incorporation of graphite particles, CeraMem Corporation's reactive alumina monolith forming process, single-channel alumina tube, etc.

The material of the ceramic monolithic is made from a member selected from the group consisting of mullite ($3Al_2O_3$-$2SiO_2$), alumina ($Al_2O_3$), silica ($SiO_2$), cordierite ($2MgO$-$2Al_2O_3$-$5SiO_2$), silicon carbide (SiC), alumina-silica mixture, glasses, inorganic refractory and ductile metal oxides. Mullite is a metal oxide compound from $Al_2O_3$+$SiO_2$ with several other possible compositions with different ratios possible, as is known in material chemistry. Crystal shapes of mullite, as well as other materials in the membrane support body, can be in hollow tube, tube or needle-like forms of high aspect ratio (>5), or conventional crystal forms of low aspect ratio (0.5~5), or a mixture of mullite crystals of high and low aspect ratio. Common crystal phases for the alumina compound $Al_2O_3$ are gamma (γ-alumina), theta, and alpha (α) where alpha-alumina (α-alumina) is typically more stable than the other phases. SiC is a silicon carbide compound which is a refractory non-oxide ceramic material having good chemical and physical stability. Vycor® glass, available from Corning Incorporated could also be used as the material for the body 150.

The body 150 of the module has a plurality of elongated apertures to form a channeled portion including pathways, passageways, conduits, or channels for forming a predetermined number of small flow channels 110. In one example, the channel size or channel hydraulic diameter 112 is in a range of about 0.5 to 3 mm, while the channel density is about 50 to 400 cpsi (channels per square inch).

Channel shape is preferred to be circular or rounded, as shown. However, the substrate channel shape could be in other shapes that are continuous with no sharp corners, such as hexagons. Even if the channels are shaped in squares, the channel shape may be modified through a subsequent coating process. Pore size and porosity of the channel wall 114 as well as surface properties (such as, roughness, adhesion, etc.) can be modified by one or more intermediate coating layer(s).

For processing different components in applications such as microfiltration, extraction, fluid mixing, etc, the porous support or the body 150 itself can be used alone. However, for some other processing applications, such as gas separation and nanofiltration, membrane coating is necessary.

If needed, a layer 160 of porous materials that have smaller pore sizes than the matrix may need to be coated onto the channel wall 114 of the substrate or matrix body portion 150 and can be used alone or with the membrane film 140. The coating layer 160 may have three functions: (1) modify the channel 110 shape and wall texture, such as, pore size, surface smoothness, etc., (2) strengthen the substrate 150, and (3) enhance the membrane deposition efficiency and adhesion. The coating layer 160 is about 10 to 200 μm in thickness and has a pore size from 2 nm to about 500 nm. Hence, one or more intermediate layer 160 is optionally disposed on the inner surfaces or walls 114 of the plurality of feed flow channels 110 to form a nano- or meso-porous layer (2 to 50 nm in pore size). The range of 0.5–50 μm is the thickness. Thus, the nano or meso porous layer 2–50 nm can be used by itself as the intermediate layer or extra layers can be used with the nano layer, together as the combined intermediate layer with a thickness of the intermediate layer 160 between 2–250 μm and a pore size of 2 nm–500 nm.

The intermediate layer 160 is preferably a member selected from the group consisting of alumina, silica, mullite, glass, zirconia, and a mixture thereof, with special preferences to alumina and silica. The coating layer 160 may be applied by the wet chemistry method such as the sol-gel process.

Optionally, a membrane film 140 providing the separation function is further applied onto the optional intermediate coating layer 160 or directly on the inner surfaces or walls 114 of the plurality of feed flow channels 110 of the ceramic support body 150. Because the layer 160 can be used alone, without another layer, the term "membrane" in general can include just the layer 160, just the layer 140 or both layers 140 and 160. Preferably inorganic, the film 140 can be a dense layer such as palladium (Pd), a palladium-alloy such as Pd—Ag, or Pd—Cu, or a non-metallic dense film that allows permeation of certain molecules in a mixture, such as SiC, or glass. For particular applications, the film 140 can be a micro-porous layer (<5 nm) such as zeolite, zirconia, alumina, silica, or glass. The preferred microporous membranes provide separation function in the molecular size level. However, the ceramic membrane body support 150 of the present invention can also be used as a support for polymeric membrane films, as the film 140.

In general, the teachings of the present invention relates to the membrane support 150 and housing the membrane support or the support itself, not about the membrane alone, hence any type of suitable membrane can be used. Moreover, the body support 150 is ideally suitable for separation where the smaller sized molecules are separated from the larger sized molecules and permeate through the support matrix 150.

In general, some mid-layers are needed between the above-mentioned membrane film and the support. The inventive use of the small-sized flow channels (<3 mm) 110 facilitates the deposition of the uniform thin membrane layer 140 and reduces thermal stresses due to the inorganic layer/ceramic support interface at the inner surfaces or walls 114. By applying the membrane 140 onto the small size of the channel 110, for example having the channel hydraulic diameter 112 about 0.5~2 mm, the thickness of the meso- (2~50 nm) and microporous (<2 nm) membrane coating layers 160 and 140, respectively, can be reduced, the pressure drop through the modifying coating layer 160 could be reduced at the same flux rate, and some power consumption could be saved to provide a more productive and effective membraned module support body 150.

Hence, for achieving high surface area, one exemplary monolithic membrane support body 150 is targeted for greater than 100 cpsi (cells per square inch) cell density having small circular channels 110 of about ~1 mm size in channel hydraulic diameter 112 to facilitate membrane coating 140. The module dimensions are targeted for about 10~50 mm with a module hydraulic diameter 102 and about 100~1000 mm in length 104. Different extrusion materials such as cordierite, mullite, alpha-alumina, SiC, typically used in diesel particulate filtering monoliths are optimized for pore size, porosity, and pore connectivity to achieve high permeability and high strength at the same time in the substrate matrix 150. However, the channel configuration used for the membrane support is different from the monolith diesel particulate filter in the emission control application. The pressure difference ($\Delta P$) for the membrane separation is substantially higher than that for the diesel particulate filtering. The present invention is especially useful for the separation that requires a high $\Delta P$, for example, replacement of the pressure-swing-adsorption (PSA) process for gas purification/separation.

In general, pressure drop decreases by reducing the diameter of the matrix body 150, increasing the pore size or increasing the porosity of the body 150. From the teachings of the present invention already described which provides for filtrate collection and the purge function, the specification of the body matrix or module design actually realizes the desired pressure difference to provide an external purge flow access to every embedded feed-flow channel. However, various combinations of specific differences in the body matrix or body design, as in arrangement of the feed channels and permeate channels, specific channel geometries, specific material designs (pore size and porosity) provide various body supports 150 for use in a processing device 10. The present invention teaches the kind of membrane module to be used and how the membrane device is arranged to perform successful sweeping of every embedded feed path or channel 110 by teaching a way of introducing purge flow to sweep the permeate side of each embedded feed channel 110. The purging capability is important to enhance the permeation rate during operation and possibly, give a clean-up method for the membrane regeneration or maintenance. The design of the suitable membrane modular device 10 provides the access of the purge flow directly to the permeate side for each of the membraned channel 110 to introduce the purge flow to permeate each membrane channel in an integrated membrane module body resulting in much better mechanical integrity and lower assembly cost.

As one of the ways to introduce the purge flow to every feed channel, the centerline channel 210 of the module or body matrix 150 introduces the purge flow 280 for purging the permeate 1852 out of the porous module matrix 150 through the interconnected poreb 150 into the exterior surface of the module body 1522 for enabling access of the purge to the individual membrane channels 110. Thus, the purge flow 280 is introduced along the centerline and is pushed out radially to the exterior of the module or body 150. As the purge stream 280 flows through the interconnected pores or tortuous paths 152 of the support matrix body 150, all of the feed channels 110 are swept on the permeation side. This is not limited to two layers of channels, as shown in FIGS. 1–1A for simplicity, but can be many layers. In general, the closer the feed channels 110 are to the external surface, the less resistance the permeation flow experiences, and the less need for the purge flow.

To make this radial-sweep flow design work effectively, the module diameter 102 is preferred to be commensurate with the pore size and porosity of the module body 150. For the radial-sweep design, the module matrix 150 needs to be uniform throughout the support matrix and the feed channels need 110 to be distributed symmetrically.

For a radial sweep flow module design, the module diameter or module hydraulic diameter 102 is critical and is preferably in a range about 9 to 100 mm. If the diameter 102 is too large, the purge flow resistance is high. If the diameter is too small, the module may not be strong enough for handling and installation. Thus, an even more preferred module diameter is 10 to 100 mm. The module or body 150 is preferred to be in a cylindrical form where the length to diameter or aspect ratio is greater than 1. The first plurality of feed-flow pathways 110 is an array of flow channels in parallel and being open on both ends for the transport of the feed stream 180, of channel size from 0.2 to 5 mm, channel density (10~1000 cpsi), and open fractional area of 0.2 to 0.8. The purge-flow pathway or channel 210 is disposed along the centerline of the body 150 for introduction of the sweep stream, being about 1 to 10 mm in diameter, in the same length 104 as the body 150 or longer to provide sweep-flow porting. The porous body matrix 150 forms the tortuous paths 152 for the sweep stream 280 and has a pore size from about 0.2 to 20 µm and a porosity from about 0.25 to 0.75. For a membrane processing application, the separation membrane film 140 is deposited on the walls 114 of the feed channels 110 and is not deposited on the wall of the second or sweep flow channel 210. However, the conduits for the second stream or purge conduits or paths 210 can be coated with a catalytic layer for a combined catalytic reaction.

In any case, the body 150 of the membrane module can be cast or made by the same extrusion process such as used with ceramic monoliths. The purge channel or pathway 210 can be extruded at the same time as the first plurality of feed-flow pathways 110. Alternatively, the purge channel or pathway 210 can also be made by drilling a hole at the centerline of the monolith body 150.

Figure 2:
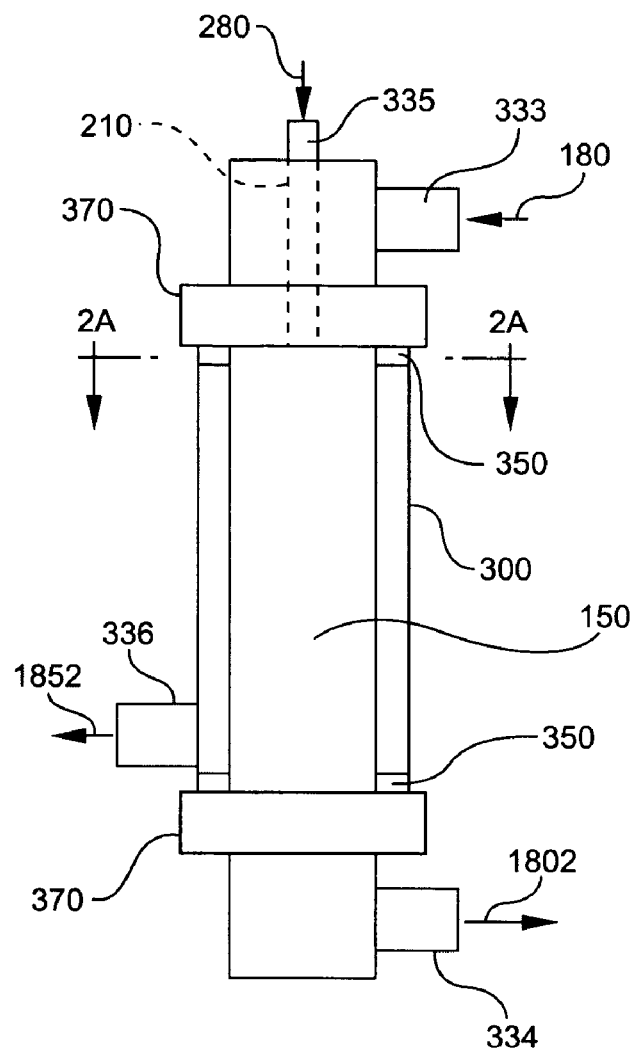
FIG. 2 is a side view of the vessel 300 of FIG. 1 housing the body 150 of FIG. 1, according to the present invention.
Figure 2A:
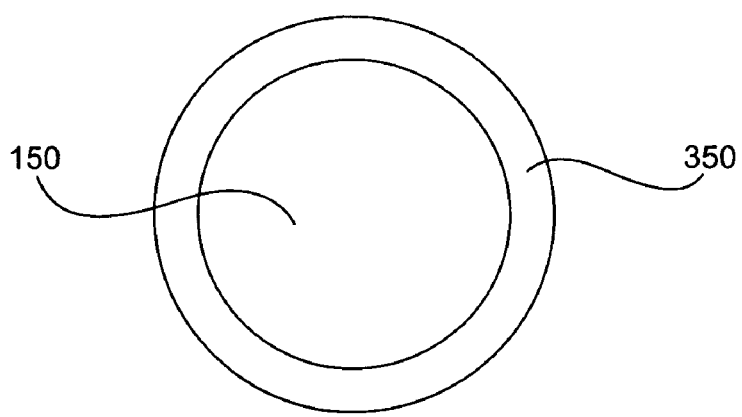
FIG. 2A is a cut-away view of cross-section 2A of the partition 350 of FIG. 1, according to the present invention.
Figure 3:
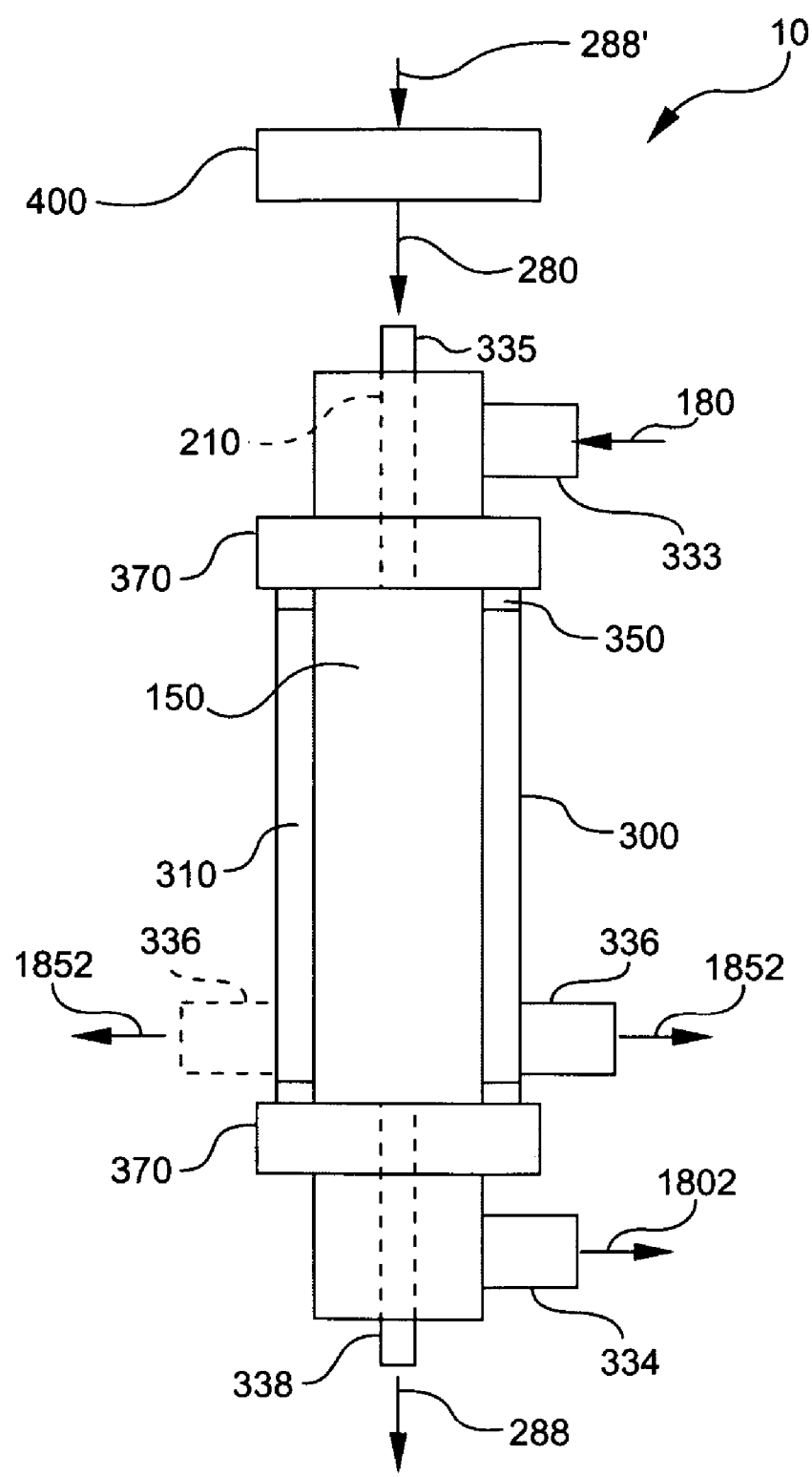
FIG. 3 is side view of an alternate porting for the vessel 300 of FIG. 1, according to the present invention.

Referring to FIGS. 2, 2A, and 3, the vessel 300 of FIG. 1 shown schematically, is now shown with two possible alternate embodiments, out of many possible housing configurations, in a side-view representation. FIGS. 2–3 show a schematic membrane device 10 using the body or module 150 as illustrated in FIG. 1. The basic components for the device 10 include the membraned module or body 150 as shown in FIG. 1 and the vessel or housing 300 providing the cavity and porting into the cavity. For providing porting, the vessel 300 includes a feed manifold or plenum 333 for introduction of the feed stream 180 through any suitable fluid or gas duct, a retenate manifold 334 for discharge of the feed stream 180, a sweep inlet port 335 for introduction of the sweep stream 280, and a second or permeate outlet port 336 for discharge of a mixture of the sweep stream 280 and permeate 1852, while one end of the central purging pathway 210 is optionally blocked by a plug 288 made of cement or other plugging material, as seen in FIG. 1.

As with all porting shown in this invention, the locations for each port is just illustrative and need not be at the exact location shown. As long as the flow rate and operating conditions are sufficient, the porting locations can be placed elsewhere. For example, it is to be appreciative that even though second outlet port 336 is shown on one side in FIGS. 1 and 2, the second outlet port 336 could be optionally ported on the other side alternatively or ported on more than one side, as seen in FIG. 3. This radial sweep-flow housing design provides two options for the sweep flow management. In the first option of FIG. 2, all of the sweep stream 280 is forced to push through the module matrix of the body 150, through the interconnected pores or tortuous paths 152 and comes out with the permeate 1852.

Referring to FIG. 3, for a second option, part of the sweep stream 280 is forced to push through the tortuous paths 152 of the module matrix body 150 and the remaining is discharged through a sweep outlet port 338, instead of being plugged by the plug 288 in FIG. 1. The remaining sweep stream 288 can be recirculated or continuously circulated as an incoming or internal sweep stream 280 through a process controller 400 that can control the pressure, direction, volume, and other flow conditions of the different fluid streams and manifolds.

Even though the ports or manifolds 333, 336, and 334 are shown oriented horizontally on one side for distinguishing and separation of flow between the ports, it is appreciated that all or most of the ports and manifolds can be oriented vertically to allow gravity to automatically control the process flow instead of using an external control, such as valves or a process controller 400 to axially or horizontally control the input or output of the streams 180 and 1802, on one or another side, as long as the different streams are separated from each other to prevent intermixing. The placement of the various ports and manifolds are arbitrary as long as the desired stream is capable of being separated in or out as desired. In this configuration, part of incoming sweep flow is pushed through the module matrix to purge the permeate, while the remaining sweep flow is discharged out of the membrane module. The discharged sweep flow may be circulated to the sweep inlet through a circulation control system 400. The control system 400 includes a circulation pump, a flow controller, a pressure controller, and so on. A fresh charge of sweep fluid 288' may be mixed with the circulation fluid to enter the membrane module.

Various configurations and embodiments are already known and can be used as the inlets and outlets for the feed and purge flows. Different forms of these inlets and outlets are already implemented in conventional separation/mixing/filtration devices without the porous ceramic module 150, such as, mixing tanks, extraction containers, single-channel membrane tubes, disk-shaped membrane modules, etc. The teachings of the present invention is how to introduce the feed to individual feed channels from the feed inlet and discharge the remaining components from all the feed channels to an outlet, and at the same time, how to introduce the sweep flow stream from an inlet and distribute the sweep stream into a number of purge conduits, collect the mixture of the sweep flow and the composition from the feed channels from those purge conduits, and discharge to an outlet in the multi-channel embedded body 150. In general, according to the teachings of the present invention, the inlet ports 333 and 335 are designed in such a way that the feed fluid 180 and sweep stream 280 are uniformly distributed into the individual first or feed channels 110 and sweep paths 210 and 152, respectively. Similarly, the outlet ports 334 and 336 are designed in such a way that the fluids coming from individual channels are all effectively withdrawn.

Referring either to FIGS. 2 or 3 and 2A, in a separation or purification process, the feed stream 180 is introduced into the feed channels 110 of FIG. 1 through the feed manifold or plenum 333 coupled to each of the feed-flow inlet 1101. Assuming there are too many channels, such as more than 1000 feed-flow pathways 110 to connect directly, a gap 310 around the central purge conduit 210 is provided to allow the feedstream 180 to flow into each of the multiple feed pathways 110. There is preferably a sealing material within, bonded to, or near opposed end caps 370 for serving as a stream or sweep partition 350 at two ends of the module or body 150 to separate the feed flow 280 from getting into the cavity or gap 310. The end caps 370 are sealed to the plurality of feed pathways 110, by the partition 350, such as o-rings, for example, to form a fluid tight seal.

The feed stream 180 moves through each of the feed channels 110, and is discharged from the membraned module or body 150 of FIG. 1 through the retenate manifold 334. Meanwhile, the sweep stream 280 is introduced by the sweep inlet port 335, flows into the sweep flow channel 210 by coupling of the sweep inlet port 335 to the purge inlet 2101 of FIG. 1, and sweeps the permeate 1852 out of the membraned body matrix 150 via the tortuous paths 152. The permeate 1852 is collected in the space, gap, or cavity 310 between the membraned module or body 150 and the wall or interior surfaces of the vessel or housing 300, and is discharged in the permeate outlet port 336.

Figure 4:
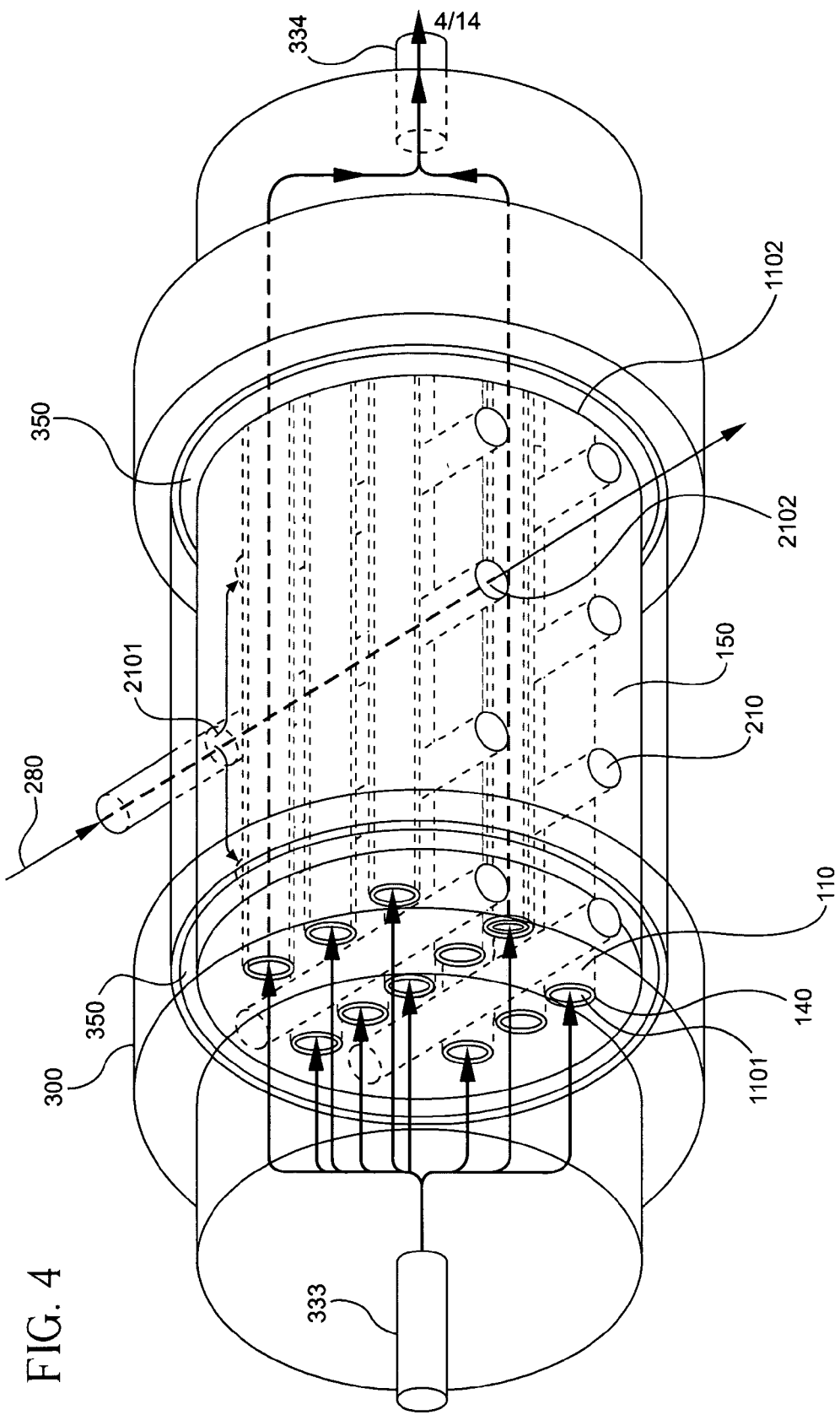
FIG. 4 is a perspective view of a tangential-second stream flow embodiment of the present invention.

Referring to FIG. 4, the same general teachings of FIGS. 1–3 can be applied to another embodiment of the device 10 of FIG. 1 laid out horizontally for a radial-sweep flow. The porous body 150 has a ceramic monolithic support matrix having interconnected pores 152 with interstices connecting the pores such that more than 20% of the total pore volume has a pore size in a range about 10 nm to 20 um. Preferably, the porosity of the ceramic monolithic support matrix body 150 is in a range of about 20–80%. The pathway wall 114 surrounding each of the first plurality of feed-flow pathways 110 define a channel hydraulic diameter 112 in a range of about 0.2 to 5 mm. The feed-flow pathways 110 are distributed in a channel density of about 10 to 500 cpsi and has a percent open frontal area (OFA) in a range about 10–50%. In general, the feed-flow pathways 110 channel density should be half of the original density of the feed-flow pathways by itself and of the OFA of FIG. 1 since there is now a second set of sweep channels. Hence, the new first plurality of feed channel density is preferably about 5 to 500 cpsi and has a percent open frontal area (OFA) in a range about 10–40%.

Instead of the single purge pathway 210 of FIG. 1, there is a second plurality or array of purge conduits 210 in FIG. 4. The purge conduits or purge paths 210 can have a shape, size, and density for the purge flow that is very different from the feed flow of the feed paths or channels 110. As already taught, the feed channels 110 are preferred to be in circular shapes, free of sharp corners, which may be optionally coated with a membrane film 140. In contrast, the purge conduits or paths 210 are uncoated or coated with a catalytic layer for a combined catalytic reaction. Moreover, the purge conduits 210 can be in channel forms similar to the feed channels 110, but in an elongated rectangular shape, even though they are shown circular for simplicity in FIG. 4. Other possible purge or second stream conduit shapes include squares, hexagons, or other hydraulic geometries.

Preferably, each of the second plurality of purge conduits 210 has a channel conduit hydraulic diameter 212 in a range about 0.2–10 mm. The second plurality of purge conduits 210 are distributed in a channel or conduit density of about 10 to 500 cpsi and has a percent open frontal area (OFA) in a range about 10–50%.

The first plurality of feed-flow pathways 110 overlaps the second plurality of purge conduits 210 in at least one point, at an overlapping angle ranging from zero degrees to ninety degrees. The two pluralities or arrays of feed pathways 110 and purge conduits 210 can be envisioned alternatively placed on top of each other, at a pivoting point, and pivoted from zero degrees to ninety degrees for the axial placement of the sweep conduits 210. With any overlapping angle between zero degrees to ninety degrees, the pathway wall between the first plurality of feed-flow pathways 110 and the second plurality of purge conduits 210 has a partition wall thickness 430 of 0.2 to 5 mm, preferably greater than 0.5 mm Not all overlapping angles are shown to minimize the number of drawings. However in FIG. 4, the overlapping angle is ninety degrees and the second plurality of purge conduits 210 are aligned perpendicularly. The first plurality of feed-flow pathways 110 has opened opposed feed ends 1101 and 1102 and open opposed sweep ends for providing the second plurality of purge conduits 210 in the body 150 on opposing sides perpendicular to the opened opposed feed ends for axially transporting the sweep stream 280 having the purge inlet 2101 and the purge outlet 2102 through the open opposed sweep ends.

Figure 5:
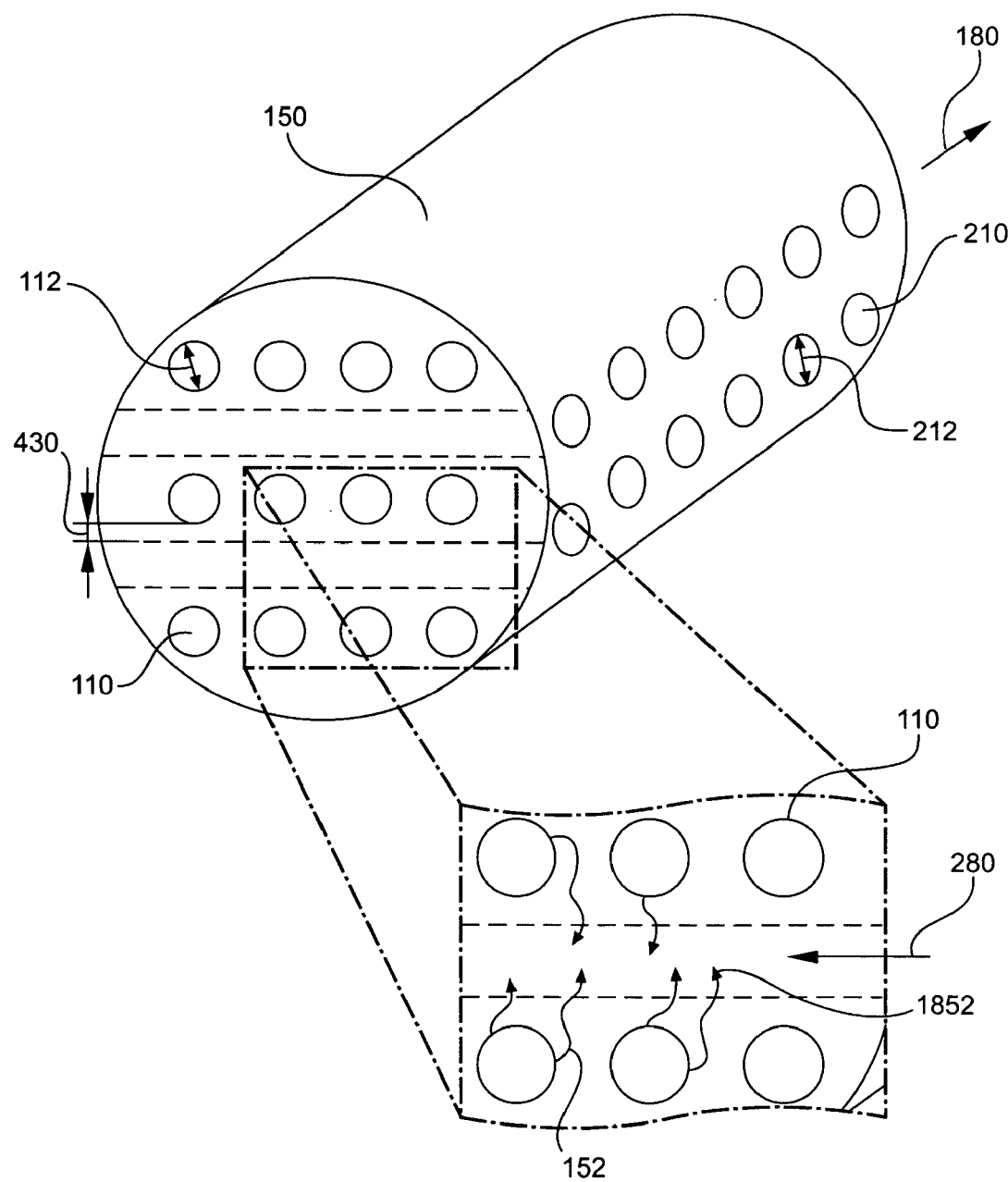
FIG. 5 is a perspective view of a tangential-second stream flow body 150 of FIG. 4, according to the present invention.

Referring to FIG. 5, just the ceramic membrane module or body 150 of FIG. 4 is shown. The portions of the body or membraned module 150 include: a porous matrix of pore size from 10 nm to 20 μm and porosity from 0.25 to 0.75; an array of parallel feed flow channels 110 being open on both ends for the feed stream 180, of a channel size 112 from about 0.5 to 5 mm, channel density (10~400 cpsi), an open fractional area of about 0.3 to 0.7; an array of purge flow channels or conduits 210 next to the feed flow channel 110 in a direction perpendicular to the feed channel 110 with both ends open for the sweep flow stream, of channel size 212 from about 0.5 to 5 mm, channel density (10~400 cpsi), and open fractional area of 0.3 to 0.7; and a separation wall between the sweep and feed flow channels/conduits of a partition wall thickness 430 from about 0.5 to 3 mm. The channel size and shape, as well as channel density of the feed and purge channels/conduits 110 and 210 do not have to be the same. The size of the feed flow channel 110 is small, preferably about 1 mm so that the substrate or body 150 provides both a high surface area about 100–1000 $m^2/m^3$ for gas separation, such as hydrogen, and provide good mechanical strength as well.

Even though the substrate module or body 150 have been built with a cross-section dimension about 10 mm to 50 mm and a length from about 50 mm to 3000 mm, there is no dimensional limit for this kind of a module design. The cross-section may be shaped in a circular form or in the square-form based on the package needed, as in FIG. 12. The channel density and size on the feed side is about 10 to 400 cpsi and 0.5 to 5 mm, respectively. The channel density and size on the sweep side is about 10 to 400 cpsi and 0.5 to 5.0 mm, respectively. The feed channel layer 110 and the second or sweep channel layer 210 are alternatively stacked and flow directions are crossed-over. The small channel sizes (1~2 mm) of the feed channels 110 and alternative stacking of feed 110 and second stream, permeation, sweep, or purge channels 210 enhance the specific separation area, enforce the mechanical integrity of the module or body 150, and shorten the diffusion path through the interconnected pores or tortuous paths 152 inside the support matrix body 150. The feed channel shape is preferably a circular shape. The wall separating the feed side and the sweep side is made of porous materials with a pore size from about 5 nm to 5000 nm and porosity about 0.1 to about 0.8. The pores are preferably interconnected so that a porous network 152 exists in the substrate matrix.

Preferably, both the zeolite membrane 140 and substrate body 150 are made of inexpensive material precursors. The raw material cost itself would be orders of magnitude less than a Pd-based material. The major cost results from the extrusion process, substrate coating, and zeolite membrane synthesis. The candidate substrate materials include alumina, mullite, alumina titanate, cordierite, SiC, and Vycor glass or other ceramic materials. The alumina material may be coated onto the bare substrate to modify the surface chemistry and microstructure. The following table gives some exemplary dimensions of the membrane substrate body 150. The actual dimension will be changed based on the specific type of application needed.

TABLE 1

Exemplary dimensions of the cross-flow membrane module

| Dimension | 4" × 4" × 36" | 2" × 2" × 12" |
|---|---|---|
| Feed Channel size, mm | 1 | 1 |
| Wall thickness*, mm | 1 | 1 |
| Channel density, cpsi (#/$in^2$) | 80 | 80 |
| surface area, $m^2/m^3$ | 500 | 500 |
| Total volume, $m^3$ | 9.44E−03 | 7.87E−04 |
| Total area, $m^2$ | 4.72 | 0.39 |

*Wall thickness includes the bare support 150, coating layer 160, and zeolite membrane 140.

The membrane module or body 150 can be made by several methods. In one method, individual sheets extruded with the feed channel geometry 110 in one sheet and the purge conduit geometry 210 in another sheet can be stacked alternatively in the green body form. Then, the assembly is fired at high temperatures to form an integrated single body. In another method, the feed channels 110 can be extruded in a monolith form. The purge conduits 210 are made on the extruded green body by drilling or a secondary extrusion process. Then, the body is fired at high temperatures to gain mechanical strength. There is no theoretical limitation to the module size. However, for effective membrane separation operation, the membrane module or body 150 is preferred to have an aspect ratio (length/diameter) greater than 1, that is, not a perfect cube-like shape.

An optional intermediate layer 160 of meso porous materials may need to be coated onto the feed channel wall 112 of the substrate. The intermediate coating layer 160 is about 0 to 100 μm in thickness and has a pore size form 1 nm to about 100 nm. Examples of the intermediate coating material 160 include alumina, silica, etc. The intermediate coating layer 160 may be applied by the wet chemistry method such as sol-gel process.

The zeolite membrane layer 140 is deposited on the feed channel wall 112, above the optional intermediate layer 160. During the zeolite synthesis process, channels or channel walls 210 on the sweep side or any sweep or second conduit 210, in general, need to be isolated, covered, or otherwise protected from zeolite coating. Selection of the zeolite material is determined by the specific separation process needed. For hydrophobic properties, silicalite or polycrystalline MFI-type zeolites are needed. For hydrophilic properties, A-type zeolites are preferred. For large pore sizes, X or Y-type zeolites are preferred. For high ion-exchange capacities, zeolites of low alumina/silica ratio are needed. The seed zeolite crystals may need to be deposited on the substrate or body 150 first in order to enhance the growth. The zeolite growth may need to be conducted more than one time for the nutrient zeolite to seal any void or pinhole formed between the zeolite crystals and between the zeolite and substrate before growth may be conducted. The preparation of a defect-free zeolite membrane 140 inside small, long flow channels 110 is a material processing challenge if the substrate or body 150 are not made to the proper dimensions.

Zeolite crystals need to be bonded onto the substrate or body 150 to have the necessary adhesion strength. Chemical composition and microstructure of the substrate 150 often affect zeolite membrane 140 preparation. Voids among individual zeolite crystals needs to be closed up by inter-growth of crystals. To make the zeolite membrane 140 exhibit the zeolitic separation function, defects or pinholes greater than the zeolite channel size have to be sealed so that the zeolite channel 110 comprises the only flow path for separation streams. Thus, the quality of zeolite membranes 140 is prepared under suitable synthesis conditions with well-controlled procedure.

Significant progress has been made in preparation of zeolite membranes and fundamental understanding. The zeolite materials used include A-type, Y-type, MFI-type zeolite, and silicalite, while the substrate materials used to support the zeolite membrane include γ-alumina, α-alumina, SiC, cordierite, and Vycor glass. Highly siliceous MFI-type zeolite, preferred for the present hydrogen purifying or reforming application, has been extensively studied in the literature. The zeolite membrane synthesis techniques are roughly classified as (1) in-situ hydrothermal synthesis method and (ii) secondary growth and vapor phase transport method. The basic procedure in the in-situ hydrothermal synthesis is to bring a support or body 150 in direct contact with the synthesis solution or gel and then to allow the growth of a zeolite film on the surface of the support 150 under hydrothermal conditions. In many cases, in-situ synthesis of zeolite membranes is conducted under conditions similar to the zeolite powder synthesis. The secondary growth method consists of two steps. The first is to coat the substrate surface by zeolite seed crystals, and the second is to grow the seed layer to a continuous zeolite film by hydrothermal synthesis. Typically, small zeolite crystals prepared in a stable aqueous phase is used to plant the zeolite seeds by either mechanical scrubbing or dip coating technique. The aim of the second step in the secondary growth method is to allow the seeds to grow into a continuous film without inter-crystalline void. The second step follows very much the same procedure as the in-situ synthesis. As compared with in-situ synthesis, the secondary growth method requires much more dilute synthesis solution, lower synthesis temperature and shorter synthesis time.

Membranes exhibiting zeolitic separation functions are reported in the literature, which shows the fundamental feasibility of zeolite membrane preparation. However, scale-up of synthesis method based on small disk or a single tube to multi-channels and/or long tubes is found to be another challenge. The monolithic structure desired is about 1 mm in feed channel size and >30 cm in length, which is much narrower and longer than previously used. Even though it is still a large technical challenge to deposit the zeolite membrane 140 inside such small and long channels 110, there is a large potential to enhance the flux by increasing the porosity of the monolith support body 130, as already taught by the teachings of the present invention.

Figure 6:
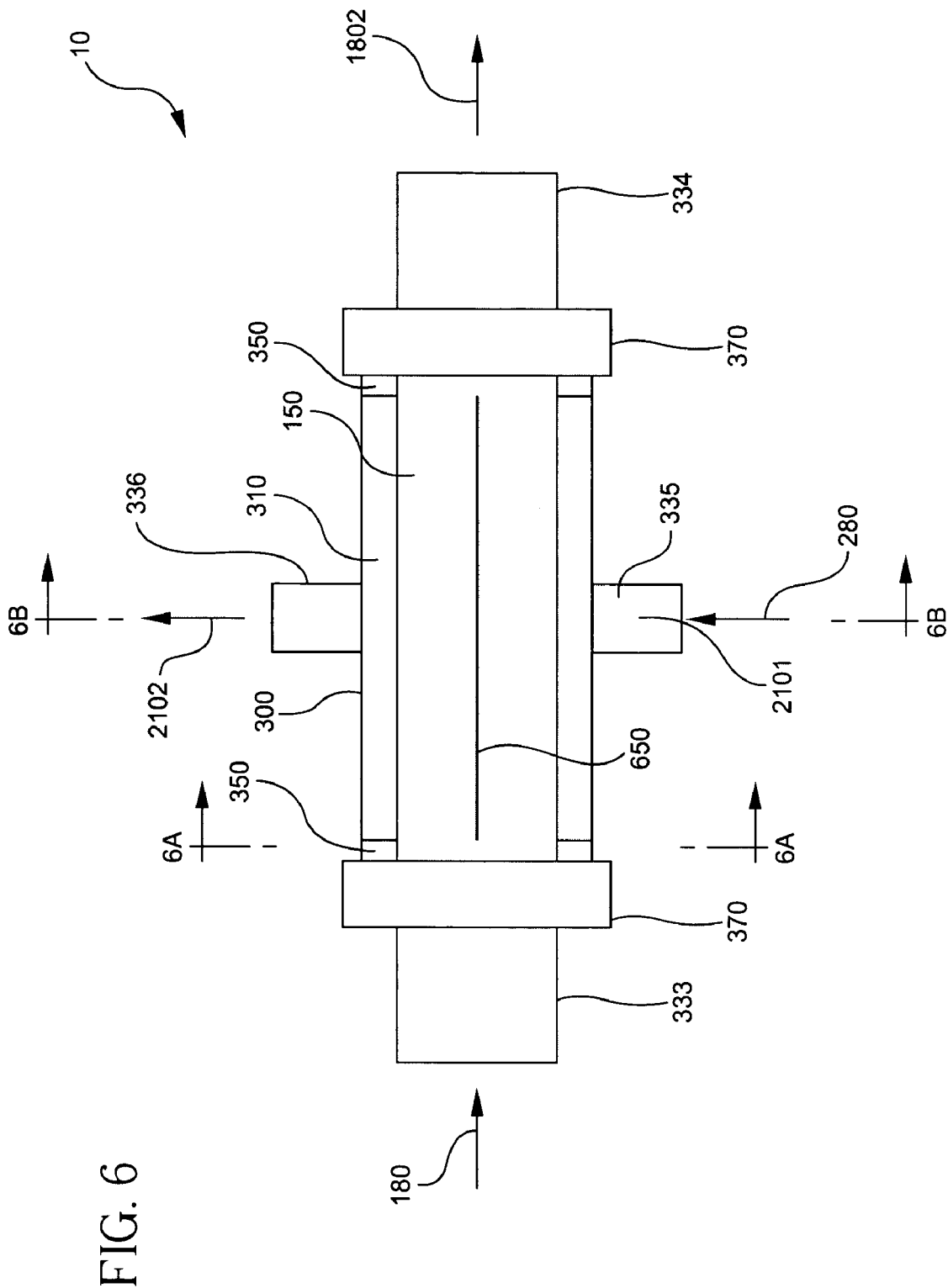
FIG. 6 is a top view of the vessel 300 of FIG. 4 housing the body 150 of FIG. 5, according to the present invention.
Figure 6A:
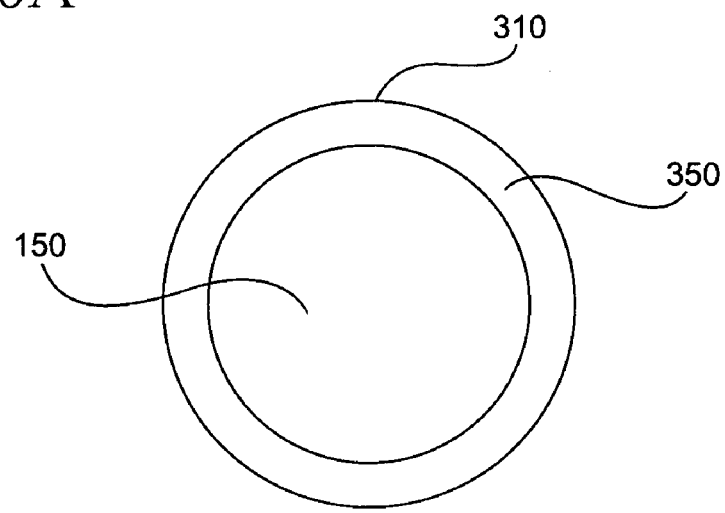
FIG. 6A is a cut-away view of cross-section 6A of the partition 350 of FIG. 6, according to the present invention.
Figure 6B:
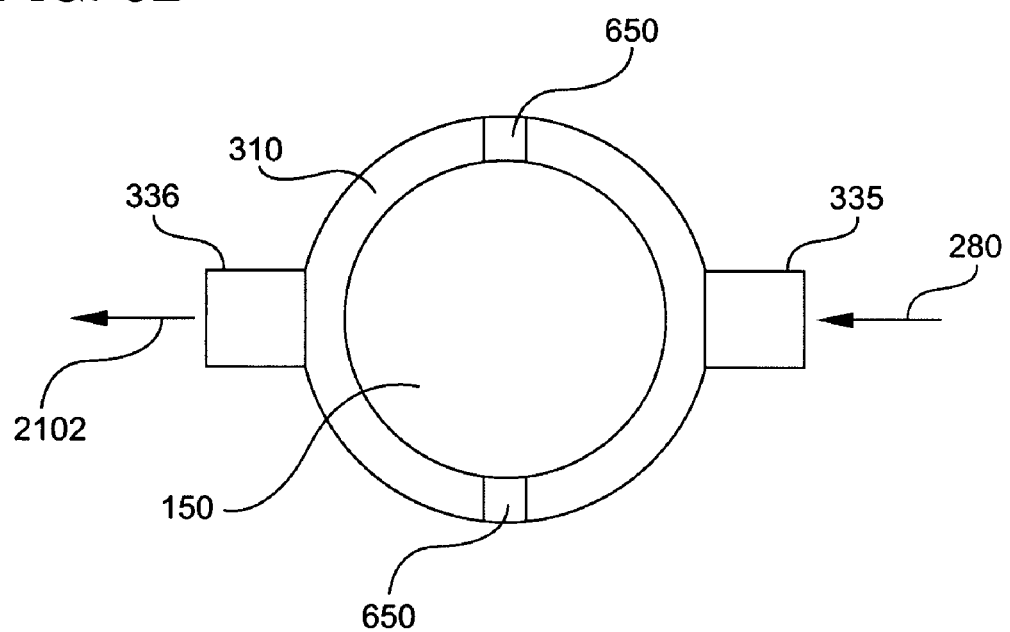
FIG. 6B is a is a cut-away view of cross-section 6B of the partition 650 of FIG. 6, according to the present invention.

Referring to FIGS. 6, 6A, and 6B, a schematic of a membrane device operation by use of the module or body 150 of FIG. 5 is illustrated similar to the simplified perspective drawing of FIG. 4 showing the body 150 included in the device 10. The basic components for the device 10 include a vessel or housing 300 having vessel walls for providing a cavity, gap, or space 310 for containing the membrane module or body 150.

If the input and output purge ports 335 and 336 are not integrally and or otherwise physically connected to the purge conduit flow inlet 2101 and outlet 2102 apertures through a material-compatible plenum, ferrule, or connector to allow direct physical porting which requires proper alignment and the proper matching of materials, an indirect or free-flow porting assembly may be easier and more economical because mis-alignment and material-mismatch will no longer be obstacles for porting to so many feed pathways 110. A space or gap 310 between the wall of the vessel 300 and the module body 150 would be needed to distribute the purge flow 280 from the inlet port 335 into the array or a plenum of purge flow conduits 210 and collect the purge flow from the array or plenum of purge flow conduits 210 to the outlet port 336. Thus, the spacer or sweep partition 650 is needed to separate the purge input 335 from the purge output 336. There should be only one sweep stream and the single sweep stream can move around the membrane module 150 in different patterns, such as, once-through, zigzag, etc., sweeping the permeate 1852 along with the sweep flow 280. That is the main purpose of sweeping. However, if the permeate 1852 gets stuck in a place where it is not swept, it may become a "dead space"—the space is not utilized. Hence, the gap 310 provides an extra purge conduit for the sweep stream 280 to sweep any permeate from the outside surfaces of the body 150. In order for the sweep stream to be able to access smoothly all required surfaces of the body 150, the housing or vessel shape is preferred to be circular or rounded, as shown, to minimize "dead space". However, the vessel shape could be in other shapes that are continuous with no sharp corners.

A feed manifold 333 introduces the feed stream 180 through a plenum or other ducting apparatus. A retenate manifold 334 discharges the feed stream 180 as the output 1802. A purge inlet port 335 introduces the sweep stream 280 and a purge outlet port 336 discharges the sweep stream as an output 2102.

Referring to FIGS. 6 and 6A, a stream partition 350 is disposed in the gap 310 between the body 150 and the vessel 300 for separating the feed stream 180 from the sweep stream 280. This stream partition 350 can be a separate first sealing package made of a resilient material but durable for the specific processing application. For example, the stream partition 350 can be a resilient disk or a suitably sized O-ring for surrounding the edge of the body 150. Alternatively, the stream partition can be detent features or other protruding features of the housing. This stream partition 350 separates the feed flow 180 from the sweep flow 210 at two ends of the module or body 150 near where the input feed flow 180 is firs introduced or last consolidated The material for the housing or vessel 300 depends on the application. For a high-temperature application and/or high pressure, the vessel 300 needs to be made from steel, typically, stainless steel. The partitions preferably are not part of the housing or vessel 300 because the module or body 150 needs to be removable. However, some features may be built into the housing or vessel 300 to make the partition placement/removal easy and be leak-free.

The shape of the vessel 300 is preferably, cylindrical, just like a column or a tube. The dead space could exist for any shape of the vessel 300 but could be minimized with a good housing design.

Referring to FIGS. 6 and 6B, a second sealing package serving as a sweep partition 650 partitions the inlet 2101 and outlet 2102 of the sweep stream 210. As one example, a pair of sweep partitions 650, in a resilient strip form, can be disposed along opposed ends of a diameter bisecting the diameter providing the input and output sweep ports 335 and 336. Because the vessel 300 is cylindrical and the body 150 is also cylindrically shaped, such as in FIG. 4, and sized small enough to fit into the vessel 300 with a remaining gap 310, than the sweep partition or second sealing package 650 could be a similarly shaped arcuate silicon or other types of durable resilient strip and placed in opposed arcuate gap bisected ring sections 310 adjacent and perpendicular to the input and output sweep stream 280 for partitioning the inlet from the outlet of the purge flow 280. Even though the body or module 150 is shown as a cylinder with a circular cross-section, the module or body 150 can be of any shape, such as an elongated cube or other shaped monolith having a square, hexagonal or rectangular cross-section, as already discussed with reference to FIG. 12.

Figure 14:
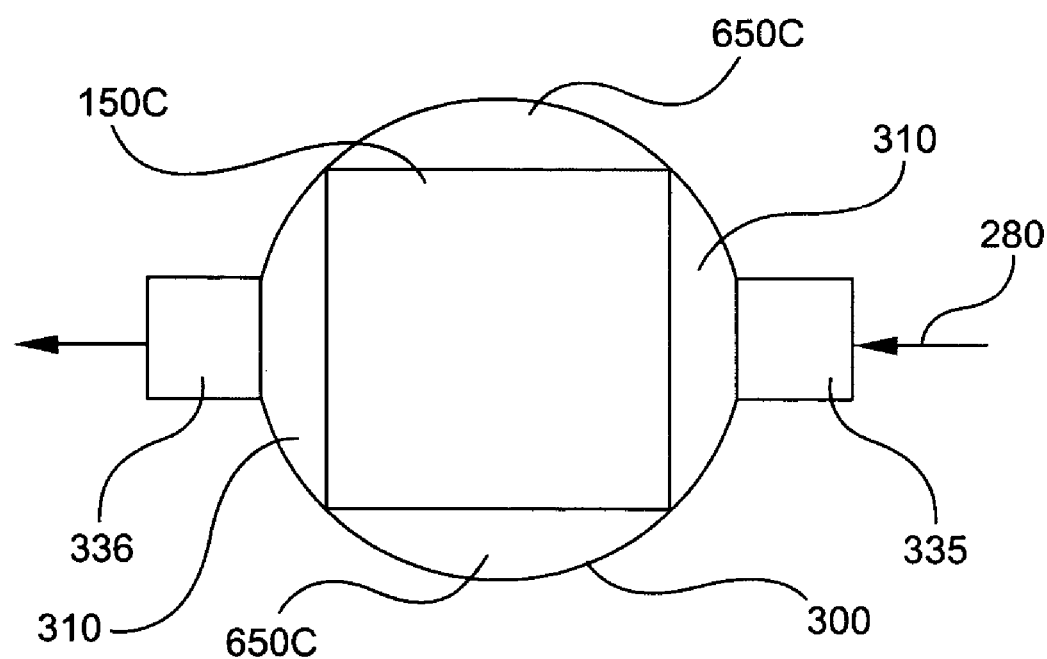
FIG. 14 is an equivalent of FIG. 6B where

Referring to FIG. 14, if the vessel 300 was cylindrical and the body 150C was square shaped and sized just large enough to segment the circular side cross-section into four separated arcuate spaces or gaps 310, than the sweep partition or second sealing package 650C could be a pair of similarly shaped arcuate silicon or other types of durable resilient gaskets, shaped to fit in the space provided and placed in opposed arcuate gap sections 310 adjacent and perpendicular to the input and output sweep stream arcuate gap sections 310 for partitioning the inlet from the outlet of the purge flow 280.

Alternatively, if the vessel 300 was rectangular, than the sweep partition or second sealing package 650 could be a similarly shaped flat silicon layer or other types of durable resilient gasket, shaped to fit in the top and bottom space provided and placed in opposed rectangularly gap sections 310 adjacent and perpendicular to the input and output sweep stream gap sections 310 for partitioning the inlet from the outlet of the purge flow 280. Instead of being two layers, the sweep partition or second sealing package 650 could be two separate spacers or retaining walls that extend up or down away from the body 150 to stop any bypass of the purge flow 280 through the void or space 310 above and below the body 150 between the body 150 and the vessel 300.

Referring back to FIGS. 6 and 6B, in a separation process, there is typically a large pressure gradient or delta P (2 to 35 bar) 170 between the feed and sweep streams 180 and 280, respectively. Thus, the stream partition 350 needs to be strong enough to prevent the feed flow 180 from entering into the sweep stream 280 without flowing through the membrane separation. In contrast, there is not much of a pressure gradient between the purge flow inlet 2101 and outlet side 2102 (<0.5 bar). The sweep partition 650 forces the incoming sweep stream 280 to enter into the purge flow channels 210 inside the membrane body 150 through the opening, aperture, or hole 2101 on the exterior of the membrane body 150. Hence, in a membrane device as illustrated in FIGS. 1–6, a simple single one-stage sweeping process can be implemented.

Referring back to FIGS. 6 and 6A, the partition material for the stream partition 350 to separate the feed stream 180 from the sweep stream 280 can be made from soft stainless steel, graphite, dense ceramics, carbon composite fibers, etc, in the forms of O-ring or ferrules. This type of sealing packaging material is generally expensive but commercially available. Since a large pressure gradient is applied between the feed and sweep streams 180 and 280, respectively, this expensive material is used to seal the gap under a large mechanical force.

However, because the partition material 650 for the sweep flow 280 does not need to sustain a high pressure difference, many materials can be used. Flexible material is preferred, such as, an O-ring made of graphite, high temperature-resistant Teflon™, quartz wool, glass fibers, Fiberflex™, etc. There are many other different kinds of materials available that are stable under the operating conditions.

Figure 7:
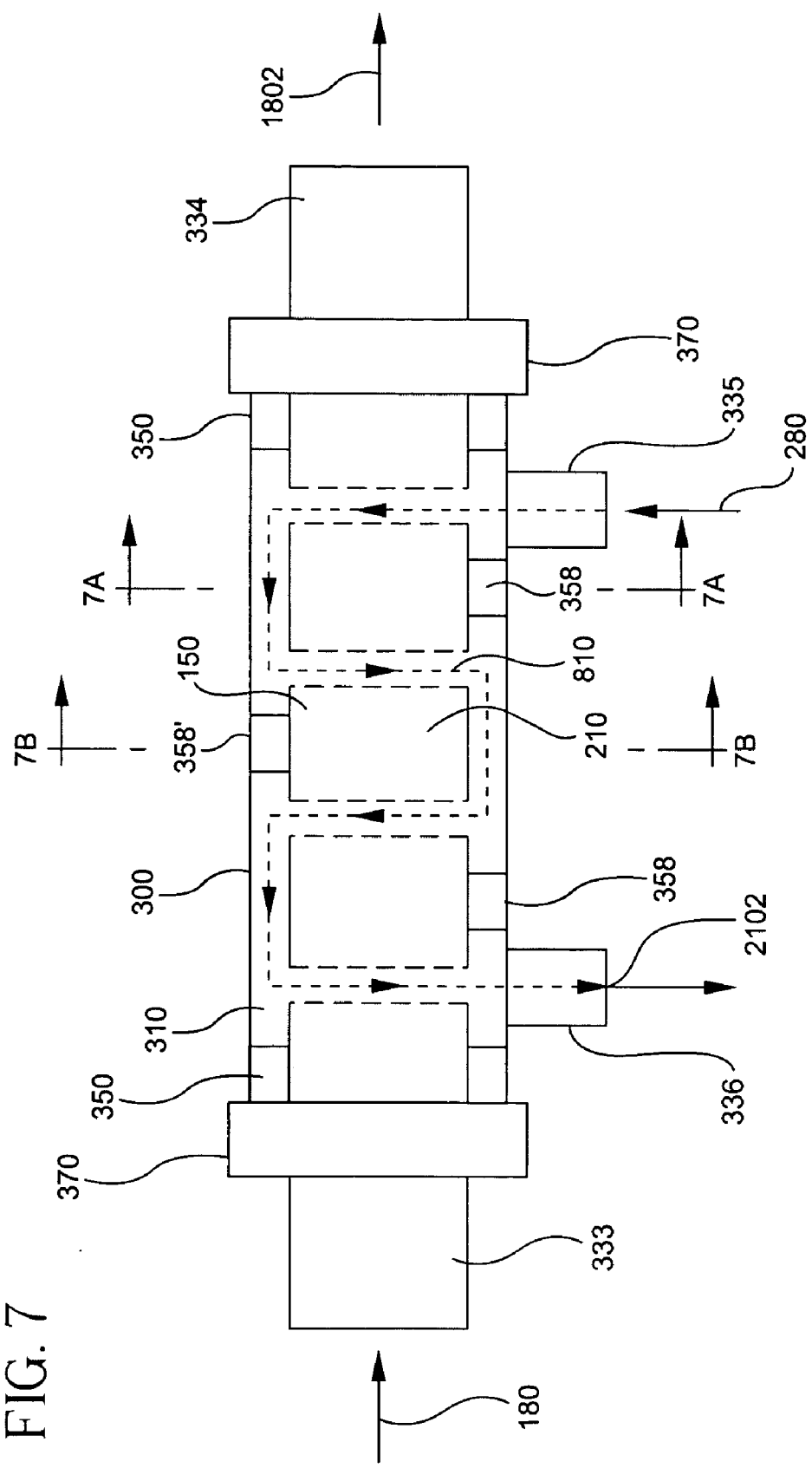
FIG. 7 is a top view of the device 10 of FIG. 6, including partitions 358 and 358' for diverting flow of the second stream 210 into multiple zig-zags, according to the present invention.
Figure 7A:
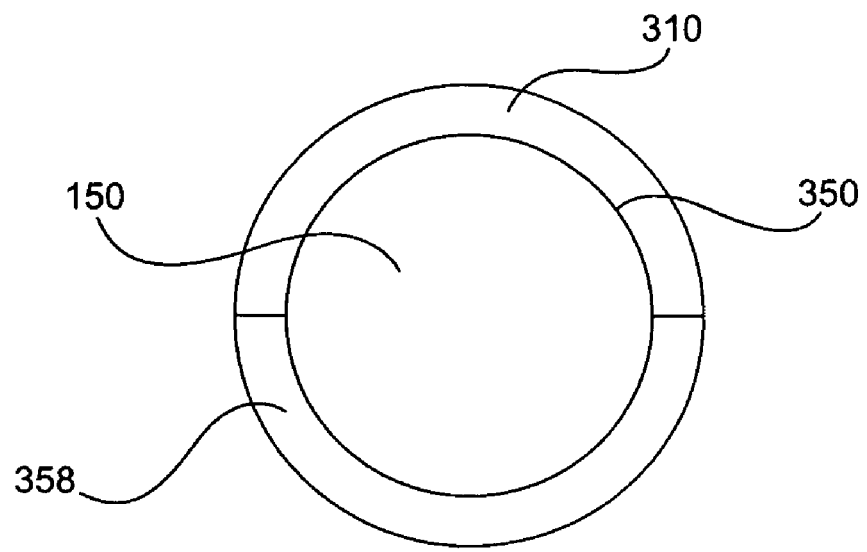
FIG. 7A is a cut-away view of cross-section 7A of the partition 358 of FIG. 7, according to the present invention.
Figure 7B:
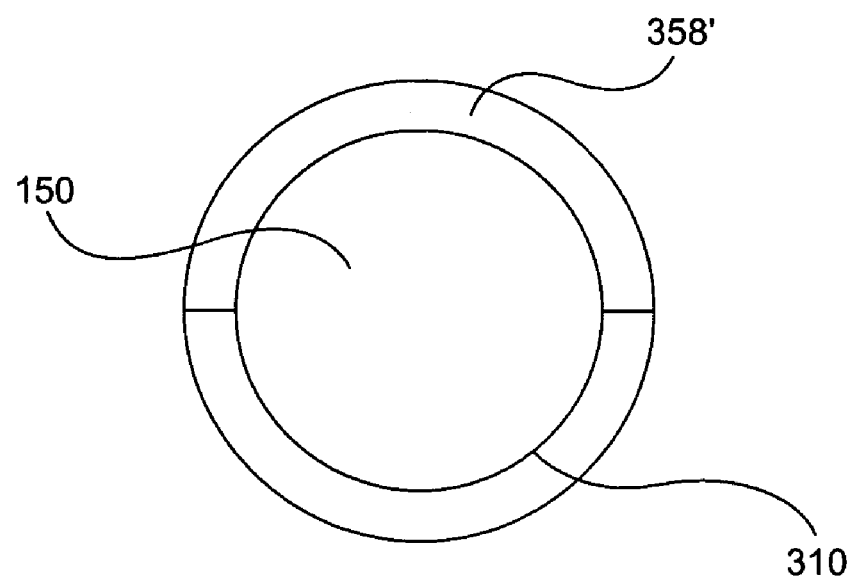
FIG. 7B is a is a cut-away view of cross-section 7B of the partition 358' of FIG. 7, according to the present invention.

Referring to FIGS. 7, 7A, and 7B, a multi-stage sweeping is made possible using a similar single membrane device 150 of FIG. 5. Additional current partitions 358 and 358' implemented as half circles of a partition ring, in the example shown, two circular plug inserted at each the purge conduit opening, or just a rectangular strip to abut the top and bottom surfaces of the housing covering the two openings of the purge conduits, are disposed on the same sides of the corner sweep partitions 350 for separating the inlet and outlet of the purge flow conduits as the purge flow 280 sweeps through the conduits 210 a multiple of times. Rings or strips can be used for partitioning of the sweep flow, depending on the shape of the vessel 300 and the module body 150. Hence, the partition can be an arcuate section or half circles of a partition ring if the vessel is 300. The additional sweep or current partitions 358 in FIG. 7 create a zigzag sweep flow direction to improve membrane performance. For example, the purge flow starts from the right side, moves into the left side through the purge conduits 210, comes back to the right side through the purge conduits 210, moves into the left side, and so on.

Thus, as illustrated in FIG. 7, a zigzag sweep flow path along the membrane module body 150 can be created by distributing the additional sweep partitions 358 and 358' in a certain pattern along the membrane body 150. By zigzagging in the pattern shown in FIG. 7, the sweep stream flow 810 is flowing in a counter-current relationship with the sweep stream inflow 210 at the input. Hence, an overall counter-current sweep operation is obtained where the overall sweep flow direction is opposite to the feed flow direction.

Figure 8:
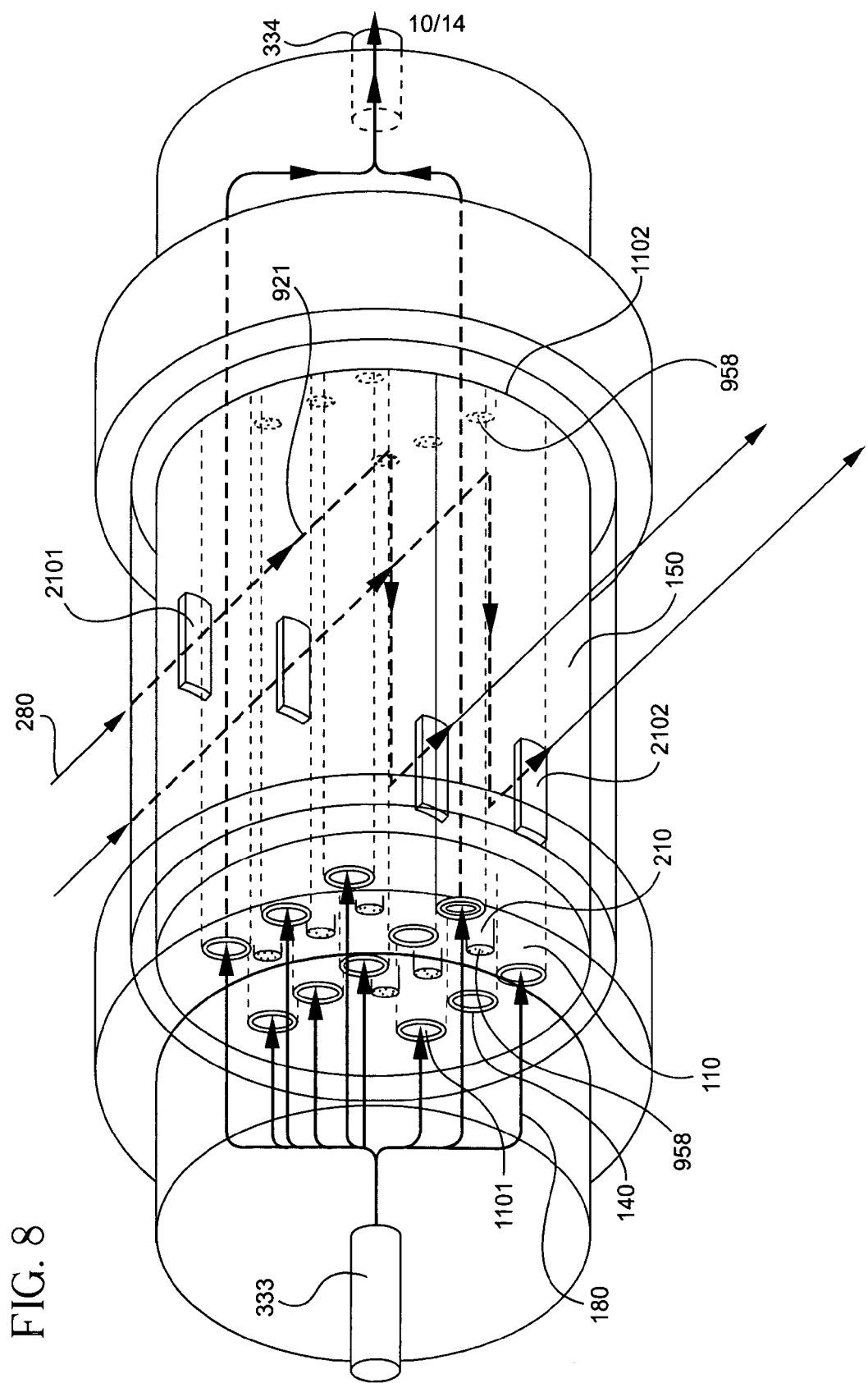
FIG. 8 is a perspective view of a parallel-second stream flow embodiment of the present invention.

Referring to FIG. 8, the overlapping angle is now zero degrees, instead of the ninety degrees in FIG. 4, between the purge conduits 210 and the feed pathways 110, with everything else being similar. Hence, the second plurality of purge conduits 210 are aligned parallel with the first plurality of feed-flow pathways 110. However, the purge conduits 210 are plugged at both ends. Hence, at least a pair of purge inlet and outlet comprise at least one aperture coupled in the body on opposing sides perpendicular to the plugged openings for transporting the sweep stream 280 from the purge inlet aperture 2101 into the second plurality of purge conduits 210 in the body 150, and discharging a purge flow mixture 1852 from the second plurality of purge conduits 210 in the body 150 to the purge outlet aperture 2102.

Hence, the array of flow channels 110 are disposed in parallel and being open on both ends 1101 and 1102 for the feed stream 180, of channel size 112 from about 0.2 to 5 mm, channel density (10~1000 cpsi), and open fractional area of 0.2 to 0.8. The array or one layer of sweep-flow conduits 210 are disposed next to another layer of the feed flow channels 110, in a parallel overlapping arrangement. Preferably, the sweep conduits 210 are offset or not aligned linearly with the feed channels 110 to maximize mechanical integrity. However, to ensure maximal sweep efficiency, each sweep conduit is preferably centered within four feed channels 110, as if the sweep conduit 210 was at the center point of four corners of a square defined by the feed channels 110. The sweep conduits 210 have both ends closed for the sweep flow stream 210 to travel within a conduit or channel size 212 from about 0.2 to 5 mm, within a channel density of about 10~1000 cpsi, and an open fractional area of about 0.2 to 0.8. The plugging material 958 on the two sides separates the feed flow 180 from the sweep flow stream 280 and serves as a stream partition. Preferably, the openings and exits 2101 and 2102 are not connected straight through, but at an offset, to force the sweep flow to flow down the sweep conduits 210 to maximally clean out the adjacent feed channel walls 114. To maximize mechanical integrity by not having each of the purge inlet aperture 2101 directly connect linearly with the purge outlet aperture 2102 in a cut-away egress, an array of egress 921 connects the holes or openings 2101 and 2102 as part of the same aperture on the external side surfaces of the membrane body 150, near both ends of the feed channels 110. The egress 921 cuts, bisects, traverses or otherwise connects each sweep flow channel or conduit 210 inside the body 150 to the exterior opening 2101 or 2102. The width of the egress 921 or of the inlet or outlet opening 2101 or 2102 is the same or smaller than the sweep channel size 212. The length of the egress 921 or of the inlet or outlet opening 2101 or 2102 is the same or greater than the sweep channel size 212. The depth of the aperture or length of the egress 921 traverses all of the sweep conduits 210, with the length the same or greater than the sweep channel size 212, such that the depth of the aperture from the exterior surface of the body 150 at the inlet or outlet 2101 or 2102 to the last sweep channel is in a row. Preferably, the partition wall thickness 430 between the feed and purge flow channels 110 and 210, respectively, is about 0.5 to 3 mm. The body 150 has a porous matrix of pore size from about 10 nm to 20 μm and a porosity from about 0.25 to 0.75.

Figure 9:
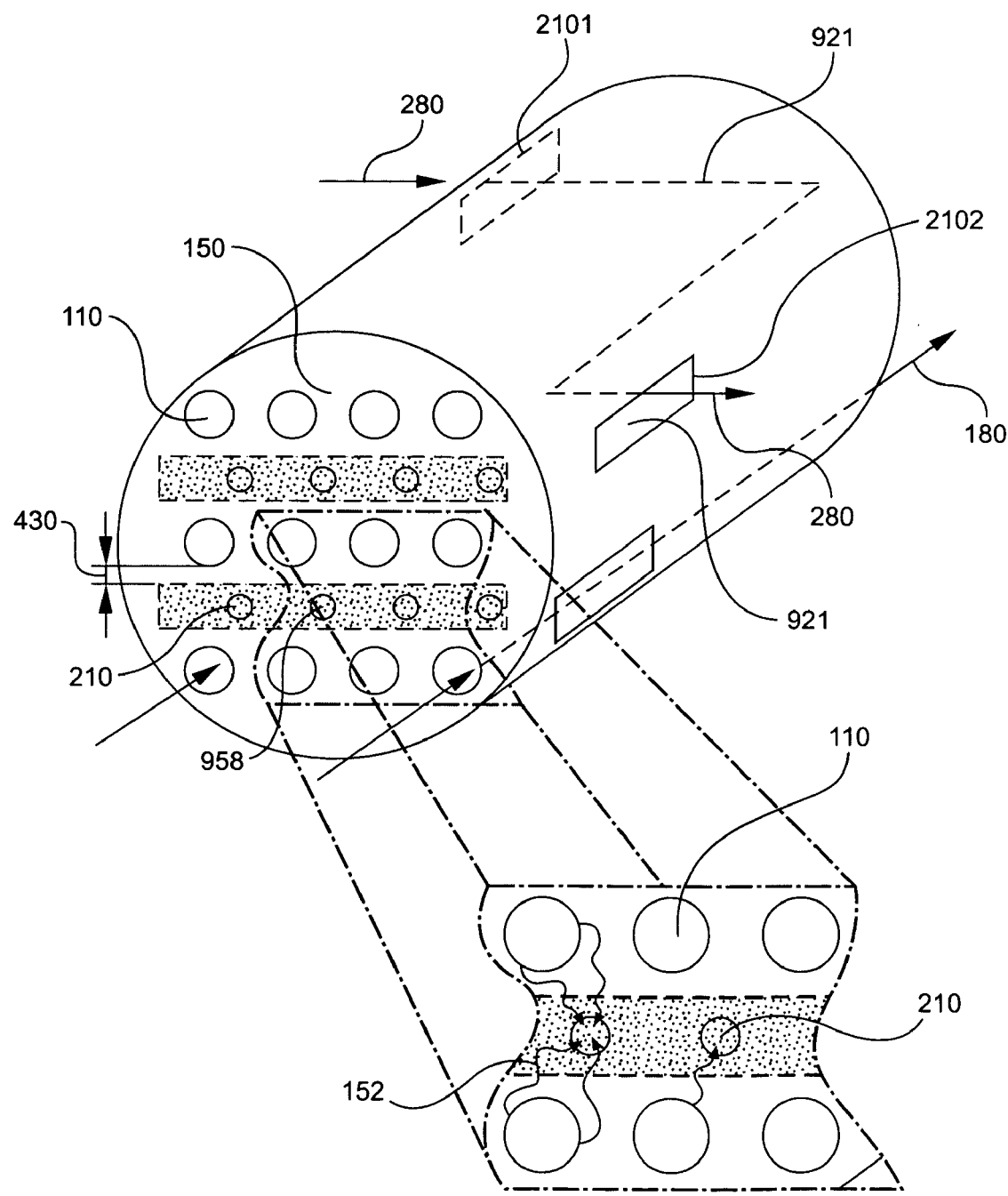
FIG. 9 is a perspective view of a parallel-second stream flow body 150 of FIG. 8, according to the present invention.

Referring to FIG. 9, just the cylindrical body 150 of FIG. 9 is shown. It is to be appreciated that other shaped monolith bodies 150 can be used according to the teachings of the present invention, as discussed with FIG. 12.

Figure 10:
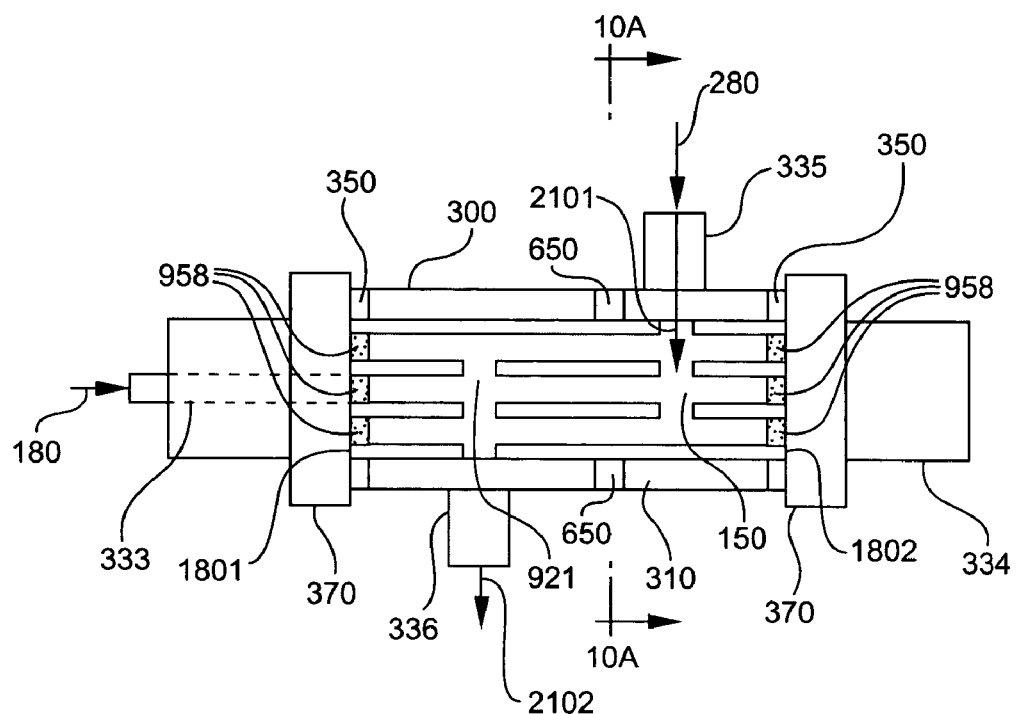
FIG. 10 is a top view of the device 10 including a similar body 150 of FIG. 9, cutting through the egress 921 of FIG. 9, according to the present invention.
Figure 10A:
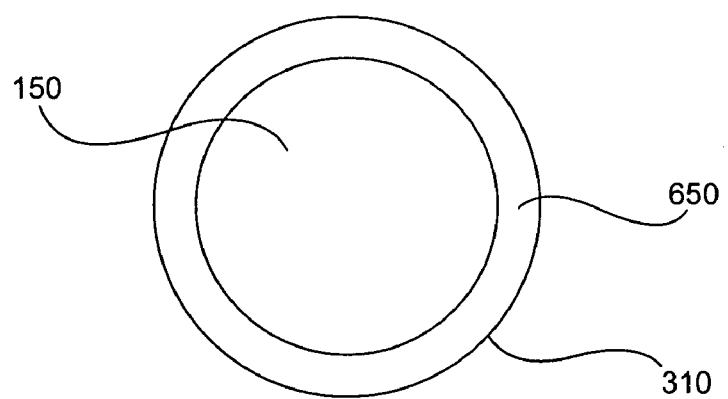
FIG. 10A is a is a cut-away view of cross-section 10A of the partition 650 of FIG. 10, according to the present invention.
Figure 11:
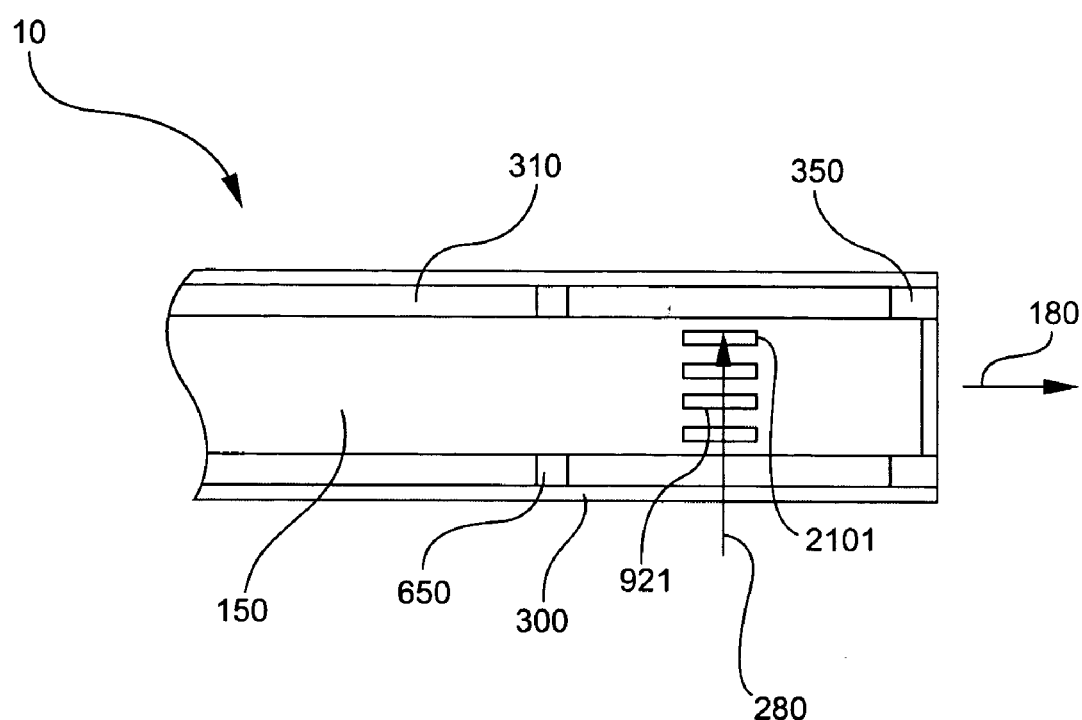
FIG. 11 is a back-side view of the device 10 including a similar body 150 of FIG. 10, according to the present invention.

Referring to FIGS. 10, 10A and 11, a body 150 similar to the one in FIG. 9 is enclosed and ported by a vessel 300 to provide a gap 310. A purge or sweep inlet port 335 or outlet port 336 serves as a manifold for introduction of the purge flow stream 280 from outside the module or body 150 into individual purge flow channels or conduits 210 inside the module 150, or for withdrawal of flows from individual purge channels 210 inside the body 150 to the outside the membrane body 150. Each opening, hole, or aperture of the egress 921 for the ports 335 or 336, respectively, corresponds to one row of the purge flow channels 210. More than a pair of openings for the purge ports 335 and 336 can be made, if needed, based on the sweep flow rate. The ratio of the sweep stream volume rate to the feed stream volume rate is preferably less than ten.

The membrane module of body 150 can be made by the extrusion process such as for ceramic monoliths, even a more economical casting process can also be used. The egress 921 including the inlet or outlet openings 2101 and 2102 for the aperture to serve as a manifold slit may be made to the monolith green body before firing. An array of drillers can be used to drill holes from the outside of the body towards the inside. The purge flow channels or conduits 210 at two ends can be plugged by use of the plugging material 958, such as cement, after firing. The plugging material 958 is preferred to have the same or similar thermal expansion coefficient as the extrusion body 150. In addition, the plugging material 958 needs to be gas tight to prevent any flow exchange between the purge and feed flow stream and also serves as a stream partition. There is no limitation about the module size. However, the module or body 150 of a high aspect ratio (length to diameter) such as >1 or >5 is preferred. The module cross-section can be made in a square shape, rectangle shape, hexagon shape or circular shape, as discussed with reference to FIG. 12.

As in other embodiments, the basic components for the device 10 include the membrane module 150 of FIG. 9, a vessel or housing 300, a feed manifold 333 for introduction of the feed stream 180, a retenate manifold 334 for discharge of the feed stream 180, a purge inlet port 335 for introduction of the sweep stream 280, and a purge outlet port 336 for discharge of the sweep stream 280.

As in FIG. 6, there is preferably a sealing material in a stream partition 350 within opposed end caps 370 for serving as the stream partition at two ends of the module or body 150 to separate the purge flow 280 from the sweep flow 180. The end caps 370 are sealed to the plurality of feed pathways 110, by the stream partition 350, such as o-rings, for example, to form a fluid tight seal.

Referring back to FIGS. 10, 10A, and 11, a sweep partition 650, such as an O-ring or other types of sealing ring partitions the inlet 2101 and outlet 2102 of the sweep stream 280. A space or gap 310 exists between the membrane body 150 and the wall of the vessel 300. The gap 310 is for distribution of sweep feed 335 into the purge conduits 210 inside the module or body.

The sweep partition 650 fills up portions of that gap 310 to prevent the sweep stream 280 from flowing through the gap 310 and bypassing the purge flow channels 210. Hence, the sweep partition 650 forces the incoming sweep stream to enter the purge flow channels or conduits 210 inside the membrane body 150 through the opening or hole 2101 on the exterior of the membrane body 150. If the vessel 300 was cylindrical and the body 150 was cylindrically shaped, and sized small enough to fit into the vessel 300 with a remaining gap 310, than the sweep partition or second sealing package 650 could be a similarly shaped arcuate silicon or other types of durable resilient ring placed in the gap ringed section 310 for partitioning the inlet from the outlet of the purge flow 280.

Figure 13:
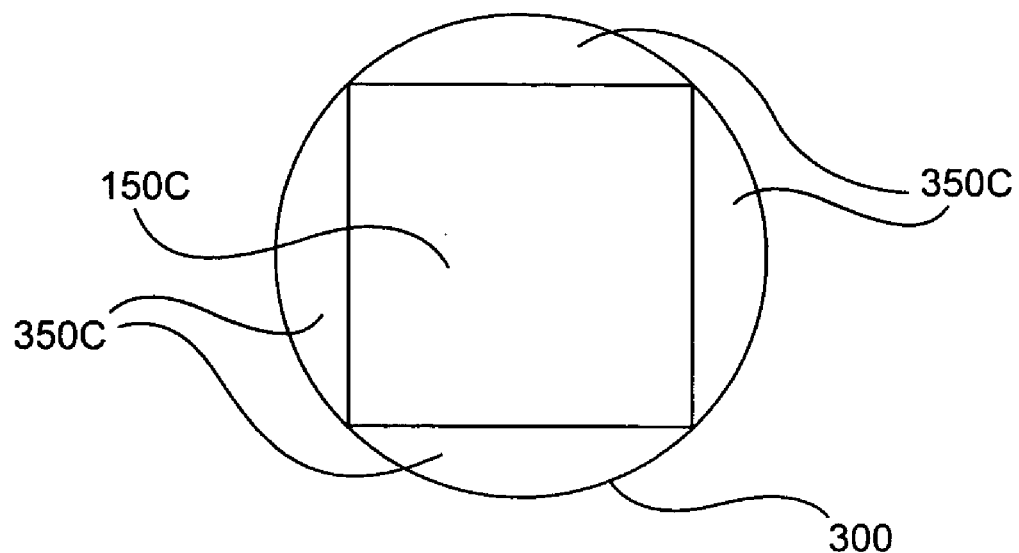
FIG. 13 is an equivalent of FIG. 10A where

Referring to FIG. 13, if the vessel 300 was cylindrical and the body 150C was square shaped and sized just large enough to segment the circular side cross-section into four separated arcuate spaces or gaps 310, than the first sealing package or the stream partition 350, and the sweep partition or second sealing package 650 could each be a set of four pieces of similarly shaped arcuate silicon or other types of durable resilient gaskets, shaped to fit in the spaces provided and placed in opposed arcuate gap sections 310 adjacent and perpendicular to the input and output sweep stream arcuate gap sections 310 for partitioning the inlet from the outlet of the purge flow 280. If the vessel 300 was rectangular and if the gap 310 was thin enough, an O-ring 650 and 350 around the rectangular body 150 would also suffice.

Referring back to FIG. 10, in a separation or purification process, the feed stream 180 is introduced into the feed channels 110 through a feed manifold 333, moves through the feed channel 110, and is discharged from of the membrane module body 150 through a retenate manifold 334.

Meanwhile, simultaneously as in a continuous second fluid process, the sweep stream 280 is introduced by the purge inlet port 335, gets into the purge flow channels or conduits 210, and is discharged by a purge outlet port 336. As shown by the solid lined arrows, the sweep flow direction 280 is preferably counter-current or flowing in the opposite parallel direction to the feed flow direction 180. However, by simply introducing the feed stream at the opposite end 334 and discharging the feed stream at the other end 333, the sweep flow direction is now co-current to the feed flow direction. Alternatively, keeping the original solid line arrow orientation of the feed stream 180, the sweep partition 650 can also serve as a current directional partition by moving it closer to the purge output 336 which will now be used as the purge input 2101, and the purge stream 280 will now be discharged through the output 335, in the opposite direction as was originally shown. Hence, the current directional partition 650 is disposed in the gap 310 between the body 150 and the vessel 300 for selecting the relational direction between the streams 180 and 280, wherein the current partition 650 separates an entrance portion of the sweep stream 280 from the discharge portion of the sweep stream to direct the sweep stream for flowing in a direction preferably countercurrent or co-current to the direction of the feed stream 180, for maximizing purging capability.

A part or fraction of the feed stream 180 is transported into the sweep stream 280 through the interconnected pores of the membrane wall to provide the permeate path 1852. It is to be appreciated that even though the sweep stream 260 has been referred to often in this present invention as a sweep or purge stream with all of its associated purge conduit, inlet, outlet, and manifolds, the sweep stream 280 can be any second stream that is different from a first stream, being the feed stream 180.

Operationally, the inventive membrane purging process can be used with any of the embodiments shown. For adsorption process, extraction process, and other mixing and reaction processes, that involves mass transfer or exchange between any two different kinds of fluid streams, the membraned modular device 10 enables those processes be conducted in a continuous manner so that high productivity and low cost is obtained. The membrane module design of the body 150 is key to achieving the desired performance. The membrane module needs to have a high contacting area between the two fluids, and also have a high permeability through the support matrix 150.

The device 10 of the present invention can also be used for mixing two different fluid streams 180 and 280. One fluid stream 280 introduced from the sweep side is added to another fluid 180 introduced from the feed channel 110 through the porous membrane wall 140 under a pressure gradient 170. This allows mixing of the two fluids 180 and 280 in a more controlled manner. In addition, the small-sized pores of the interconnected pores or tortous paths 152 on the channel wall allow a high dispersion of the fluid to be mixed, that is, generation of small droplet or domain size for formation of nano-sized or micro-sized particles. One exemplary use is for the preparation of perylene nanoparticles. Perylene is fluorescent and electroluminescent with many uses in biological and medical field. The membraned modular body 150 of pore size about 10 to 100 nm can be used to produce nano-sized perylenne particles in a water-based solution. Ethanol solution 280 of perylene ($1\times10^{-5}$ to $1\times10^{-3}$M) is introduced into the membrane modular device 10 from the sweep side, while water fills and flows in the feed channels 110. A pressure gradient 170 of about 0.1 to 2.0 bar is applied between the sweep 280 and feed fluid 180 so that the perylene solution permeates through the membrane 140 and gets into the water phase. The membrane pore size limits the size of the perylene into the water phase. As a result, 10 to 100 nm size of dispersed perylene particle are formed in the water phase. Hence, the input and output of the sweep and feed conduit/channels 210/110 are as follows:

| | Sweep side |
|---|---|
| In | ethanol solution of higher concentration of Perylene |
| Out | not fluid or ethanol solution of lower concentration |
| | Feed side |
| In | water solution of no or lower concentration of Perylene particle |
| Out | water solution of higher concentration of Perylene particle |

Thus, the size and size distribution of the perylene can be controlled by the membrane pore size and size distribution. The mixing rate can be controlled by adjusting the pressure gradient and the membrane thickness. The inorganic membrane 140 is particularly effective for the mixing process that involves the organic material and/or requires high temperatures.

The body or module 150 itself of the right pore size and pore size distribution (such as about 10–100 nm) can be used for the mixing process without the additional deposition of the membrane layer 140. However, if the module or body 150 with a pore size (such as 0.2 to 20 μm) is not suitable for a specific application and/or does not have suitable surface properties (smoothness, hydrophobilcity, hydrophilicity, etc.), then, a membrane film 140 or the modifying layer 160, used alone or together with the membrane film 140, (such as 10–100 nm in pore size), preferably made of inorganic materials, may be used to modify the support pore size and surface properties.

Extraction process is one class of separation or purification technology usable with the membrane modular device 10 of present invention. The adsorption can be in liquid or in gas phase, while the extraction is performed in the liquid-phase. In the extraction process, the targeted species have different solubility in two different liquid-phase fluids so that the species in the less-soluble fluid is extracted into the more soluble fluid. In a typical extraction process, two kinds of liquid-phase fluids are mixed and contacted to achieve the partition equilibrium, and then, two fluids are separated. For effective contact between two fluids or good extraction efficiency, the two fluids need to be mixed well. However, if the two fluids are well mixed in a conventional process, it is difficult to separate them. Thus, even though the conventional solvent extraction process is a proven unit operation process, it still has its technical limitation. For example, the solvent extraction device such as a packed column or a mixer settler can be operated only within a narrow flow range. Besides, a density difference between the two phases is required.

The membraned device 10 enables the extraction process to be performed in a continuous manner. Operationally, referring to any embodiment, including FIGS. 1–13, if the membrane film 140 deposited in the inner surfaces or walls of the feed-flow channels or pathways 110 is an adsorbent, such as zeolite material for use as a layer of adsorbent film, the application of the device 10 can be used for a continuous extraction process at a pressure differential between the feed and sweep streams from about zero to about 2 bar, and at a temperature from 0° C. to 100° C. Two kinds of fluids have an interfacial contact in the membrane layer 140 so that the targeted species in the first composition 1852 to be permeated is extracted from the first fluid I or feedstream 180 to the second fluid II, sweep, purge, or any other second stream 280. In this way, the two bulk fluids do not mix together in the first place and thus do not need to be separated. Clearly, to have the high extraction efficiency, interfacial area (same as the membrane area) needs to be as high as possible, which is made high by the present invention with the multiple, small-sized feed channels 110. The membrane device 10 can also be used for other mixing or reaction processes where mass transport from one fluid stream into another way is involved, and the mass transport rate is proportional to the interfacial area or membrane surface area. Hence, the membrane thickness needs to be thin to have a high mass transfer rate through the membrane 140. Thus, the membrane device 10 can be used to conduct continuous extraction process, where a component or a part of the feed liquid-phase stream is transferred into the second or sweep liquid fluid 280 through an interfacial contact in the membrane wall.

Hence, the membrane modular device 10 of the present invention can be used to conduct a continuous extraction process. The membrane extraction process enables independent control of flow rate for each phase, extraction of the fluid stream 1852 containing the particulate, and use of two fluid streams of the same or similar density. In the membrane extraction process, the solute species moves from the raffinate phase 180 into the extract phase 280 by diffusion through the membrane pore of the interconnected pores or tortuous paths 152. The raffinate phase 180 is the fluid that contains the solute species to be extracted, while the extract phase 280 is the fluid that has a higher solubility or affinity to the solute species than the raffinate. Thus, the driving force for the solute to diffuse through the membrane is the chemical potential difference of the solute in the two different fluids 180 and 280.

As is known, the chemical potential for a solvent system is related to the affinity of a solute to the solvent, which is independent of the pressure in a liquid system. For the gas-phase, the chemical potential is related to the partial pressure. Hence, for the membrane process, the driving force for the solute to move from the raffinate to the extract is the chemical potential difference. No pressure differential across the membrane should be applied, because a pressure gradient may result in mixing of the raffinate with the extract which should be avoided in the membrane extraction process. However, in the membrane mixing process for gas, a pressure gradient has to be applied to force one fluid into another fluid through the membrane layer.

One example is the extraction of acetic acid from aqueous solution by methyl isobutyl keton (MIBK) solvent. A membrane module of pore size from about 0.2 to 20 μm is used. The acetic acid solution is introduced into the membrane module into the feed channel 110, while the MIBK solvent is introduced into the purge flow conduits 210 from the sweep side. The feed fluid 180 is maintained at the same pressure as the sweep fluid 280, that is, no pressure gradient is created, so that one fluid is not forced into another fluid. An interface is formed between the two fluid streams 180 and 280 in the porous membrane layer 140. Acetic acid diffuses from the aqueous solution into the MIBK solvent at the interface at 20° C. Hence, the following illustrates the input and output of the feed and sweep channels/conduits 110/210, respectively:

| | Sweep side |
|---|---|
| In | MIBK solvent of no or lower concentration of acetic acid |
| Out | MIBK solvent of higher concentration of acetic acid |
| | Feed side |
| In | aqueous solution of higher concentration of acetic acid |
| Out | aqueous solution of lower concentration of acetic acid |

Thus, in the membrane extraction process, in principle, the feed side and sweep side can be used for either the raffinate or extract. However, the fluid stream containing the "dirty" materials that can cause plugging or fouling is preferred to be introduced into the channels that can be readily cleaned. For example, the raffinate containing particulate is preferred to be introduced into the feed channels 10 with straight flow paths. In the membrane extraction process, the extraction rate is largely affected by the diffusion rate of the solute through the membrane layer 140. Since no or little pressure gradient exists, the thin membrane thickness is preferred, e.g., <1 mm. Extraction can thus be used in a variety of industrial processes, refining, petrochemical, food, biological, pharmaceutical, etc. The membrane 140 enables direct extraction of the raffinate containing particulate, since the membrane layer 140 blocks the particulate from getting into the extractant. An organic solvent is often used as the extract. The inorganic membrane modular device 10 is expected to offer long durability. In addition, such an inorganic membrane 140 enables extraction to be conducted at high temperatures, which increases the extraction rate and may also enhance extraction efficiency.

However, the module body 150 itself of the right pore size and pore size distribution (such as about 0.2 to 20 μm) can be used for the membrane process without the additional deposition of the membrane layer 140. However, if the membrane module does not have the pore size suitable for a specific extraction process and/or does not have suitable surface properties (smoothness, hydrophobilcity, hydrophilicity, etc.), then, the modifying layer 160, used alone or with a membrane film 140, preferably made of inorganic materials, may be used to modify the support pore size and surface properties. The thickness 430 between the feed channel wall and the purge conduits is as small as possible, preferably, <2 mm. Also high porosity of the module matrix is preferred, 0.35 to 0.85.

The device 10 can also be used for separation and purification purposes where the recovery of desired products from a fluid mixture or removal of unwanted impurities from a fluid stream are made possible. Using such a membraned device 10, enables more energy efficient processes, compared to conventional adsorption, extraction, distillation, and crystallization techniques. Adsorption and extraction technologies have been widely used in the process industries for purification or separation of process streams. The conventional processes are typically operated batch-wise and are associated with complicated process steps, high energy and capital cost. By employing continuous sweeping, the membrane modular device 10 of the present invention makes it possible to operate these processes in a continuous manner, which results in high productivity and reduces costs.

In the conventional adsorption process, one component or a part of raw feed material is selectively adsorbed on a solid adsorbent. The adsorbed species are either the desired product to be recovered from the raw feed stream or the undesirable impurity to be removed for purification of the raw feed stream. After the adsorbent is saturated or fully loaded with the adsorbed species, the adsorbent needs to be regenerated by releasing the adsorbed species. If the adsorbed species are desired products, they need to be recovered. The regeneration often involves the use of a sweep or purging fluid stream. If the adsorbed species are impurities, they need to be disposed. Thus, the conventional adsorptive separation process includes two independent basic steps (1) adsorption and (2) regeneration. For the gas-phase adsorption process, the adsorption is often conducted at a higher pressure and the regeneration (or desorption) is conducted a lower pressure, in the reverse direction, which is well known as the pressure-swing adsorption (PSA) process. For the liquid-phase adsorption process, the regeneration is often done by use of a solvent different from the feed fluid.

There are two fundamental problems with the conventional adsorption-based separation process. First, during the adsorption process, at a given moment, only a small fraction of the adsorbent bed is working. An adsorption front is typically formed during the adsorption process. Before the front, the adsorbent is saturated, after the front, the adsorbent is not utilized. As the adsorption proceeds, the front moves down along the bed depth. As a result, only small fraction of the adsorbent is actually utilized at a given moment. Second, regeneration or desorption needs to be performed in a way reverse to the adsorption process. Thus, multiple adsorbed beds are needed, which results in large capital cost. Furthermore, constant pressurization and depressurization of the adsorbent vessels consumes a lot of energy. Though the conventional adsorption process is widely used in the industry and laboratory for separation and purification of fluid streams, it thus has fundamental shortcomings.

On the other hand, the membrane-based adsorption process enabled by the device 10 provides a solution to dramatically reduce the capital and operation costs. In a membrane separator by using device 10, the targeted species is adsorbed onto the membrane 140 in the feed side, permeates through the membrane 140, and is continuously removed out of the membrane 140 on the purge side. In this way, all the membrane area is actively utilized at any given moment and a steady-state operation is realized.

The process streams handled by device 10 can be purified by adsorbing undesirable impurities over an adsorbent, such as the zeolite material, or any process stream containing a desired component that can be recovered by adsorbing on the zeolite material, in any industry, environmental, refining, gas, petrochemical, biological, pharmaceutical chemical, biochemical, or other processing application. Exemplary applications include water removal from a gas stream as in a natural gas process and fuel cell operation particularly using PEM fuel cells for water control.

The zeolite adsorbent film can also be used for a continuous adsorption process and operated at a pressure differential between the feed and sweep fluid stream from about 1 to 50 bar and at a temperature from about 0° C. to 700° C. During continuous adsorption, the feed channel wall 114 of the membrane module or body 150 is coated with a selective adsorbent film 140, the adsorbing species adsorbed on the adsorbent 140, diffuse through the tortuous paths 152 of the channel wall, get into the purge conduits 210, and are swept away by the sweep flow stream 280.

Separation of the gas mixture occurs on the zeolite membrane layer 140 by selectively adsorbing some components in the gas mixture into the zeolite pores. These adsorbed molecules are continuously withdrawn out of the zeolite pore to another or second array of flow channels 210 and swept out of the membrane module or body 150 of device 10. The separation is conducted under the conditions so that the zeolite layer is highly selective to adsorb certain components in the gas mixture. Hence, the separation temperature is below 200° C., preferably below 100° C. The low temperature generally favors adsorption. The feed gas stream 180 is under a certain pressure, for example above 2 bar. The high pressure generally favors adsorption.

The preferred low-temperature operation of the zeolite membrane 140 provides a lot of benefits, such as, low energy consumption, high durability, low module installation costs, etc. However, there is no fundamental problem to operate the zeolite membrane at 300~600° C. At those temperatures, gas-phase diffusion inside the zeolite pore instead of adsorption would become dominant separation mechanism.

In principle, the present invention is applicable to any separation system by choosing a suitable zeolite membrane material for the particular gas mixture. For example, separation of molecules of the same size but having different adsorption property can be achieved with the device 10.

In a separation process of linear molecules from branched molecules, the gas mixture feedstream 180 is passed over the zeolite membrane 140 of high adsorption affinity towards linear molecules at temperatures below 400° C. and pressures 170 above 5 bar. The zeolite membrane 140 has no or low acidic sites to minimize the catalytic reactions. Silicalite or ion-exchanged ZSM-5 zeolite of high silica/alumina ratio is preferably used as the membrane film 140.

For drying processes, the zeolite material of high adsorption affinity toward $H_2O$ is used for the membrane film 140. In such a separation process for water vapor-containing gas mixtures as the wet gas feedstream 180, the gas mixture 180 is passed over the zeolite membrane 140 of high adsorption affinity towards water vapor at temperatures below 100° C. and pressures above 1 bar for selective rejection of water vapor from the wet gas stream 180 to yield a dried gas as the retentate. The A-type zeolites are used for the membrane 140. The water vapor may be drawn out of the membrane by pulling vacuum through the second conduits 210.

Device 10 can also be used in the emerging field of reaction chambers where a controlled feed addition and/or product withdrawal or a combination of reaction and separation in a single vessel is required. A biomembrane reactor for cell culture is a first example of the device 10.

For separation of a gas mixture 180 including hydrogen and hydrocarbon molecules, the zeolite material of high adsorption affinity toward hydrocarbon molecules, such as silicalite, can be used as the membrane film 140. In this separation process for hydrogen/hydrocarbon gas mixtures, the gas mixture 180 is passed over the zeolite membrane 140 of high adsorption affinity towards hydrocarbon molecules preferably at temperatures below 100° C. and pressures above 5 bar. The MFI-type zeolite such as silicalite is preferably used for the membrane 140 for rejecting and permeating out the rejected impurity gas of non-hydrogen molecules, leaving the hydrogen retentate gas. Since the hydrocarbon molecules have a low diffusivity or transport rate, sweeping the permeate side with a gas flow stream would greatly enhance the permeation rate. The sweep gas to the feed gas flow ratio is about 0 to 1. At temperatures below 100° C., non-hydrogen molecules are preferentially adsorbed into an MFI-type zeolite pore and permeate through the membrane 140, while hydrogen permeation through the zeolite membrane 140 is nearly completely blocked at these low temperatures.

Because the zeolite 140 and substrate 150 material are all stable metal oxides over the operating temperature range of 25–120° C., and because there are few other failure modes, the device 10 is expected to reach a 100,000 h operating lifetime. Moreover, because the undesired gas constituents 1522 are rejected through the membrane 140 (in this case, even though generally, the permeate can be collected as the end product) and the purified hydrogen gas, as the retentate, does not permeate the membrane 140, the equivalent hydrogen flux can be one order of magnitude higher than in methods where hydrogen is the permeate. Compared to active carbon-based membranes, zeolite-based membranes exhibit both higher permeation flux and higher selectivity by about two orders of magnitude. Since the desired hydrogen product stream does not permeate through the membrane 140, the parasitic power consumption is also significantly reduced.

For conventional hydrogen separation membrane processes (Pd-based, polymer-based, microporous membranes), hydrogen gas is forced to pass through the membrane. Substantial amount of pressure gradient, 5 to 30 bar depending on the application, needs to be applied across the membrane where the hydrogen gas is the desired product gas stream. Thus, compressing gas consumes a significant fraction of power.

In contrast, pressure drop of the hydrogen product stream passing through the membrane 140 of the present invention is minimal, since the hydrogen gas flows through the straight feed channels 110. The non-hydrogen gas 1852 permeated through the membrane 140 is only a waste gas stream and can be burnt out. As a result, the parasitic power consumption of the inventive membrane separation is estimated fairly low, about 0.1 KW/1000scfh $H_2$.

Hydrogen and hydrocarbon gas mixtures are commonly involved in the catalytic conversion process in various processing industries, such as, refining, petrochemical, chemical, etc. The membrane module of present invention enables the zeolite membrane separation process be of low capital cost and low operation cost for enrichment or recovery of hydrogen gas from those gas mixtures.

This inventive approach is also well suited to hydrogen purification from catalytic reformer gas streams. Catalytic reforming of hydrocarbons with steam and/or oxygen is a major process technology for hydrogen production. The resulting reaction mixture typically consists of larger portions of hydrogen and smaller portions of other undesirable impurities, which includes CO, $CO_2$, $H_2O$, $N_2$, small amounts of un-converted hydrocarbons, and other impurities. For some application, high purity hydrogen gas (e.g. 99.99%) is needed. In this case, Pd membrane is a good option to make high purity hydrogen gas. In other cases, high purity $H_2$ gas is not necessary and only the un-desirable components need to be removed from the $H_2$ gas mixture. For example, to the PEM fuel cell application, CO has to be removed below <10 ppm, while other impurities such as $N_2$, $H_2$, and $CO_2$ have insignificant impact to the fuel cell performance. The membrane technology as taught by the present invention provides an option for selective rejection of certain, poisoning gas molecules such as CO from the hydrogen gas mixture, by use of a CO-selective zeolite membrane 140.

In a separation process for producing a cleaned gas from a CO-containing gas mixture, as the feedstream 180, the gas mixture 180 is passed over the zeolite membrane 140 of high adsorption affinity towards the CO molecule at temperatures below 300° C. and pressures above 2 bar. Ion-exchanged zeolite membranes 140 (where the adsorption selectivity of the zeolite is modified by ion-exchange) are preferably used as the membrane 140 for permeating out the CO. To enhance the driving force for the CO permeation, the permeate side is swept by the oxygen-containing purge gas 280. The permeated CO is reacted with $O_2$ to form $CO_2$ that is swept away. To facilitate the CO oxidation, a catalyst coating may be applied to the purge conduit 210. Hence, the membrane process for selective rejection of CO from a CO-containing gas stream 180 results where a CO oxidation catalyst layer is deposited on the sweep side in order to enhance the chemical potential pressure gradient 171 across the zeolite membrane 140. In such a separation of a gas mixture 180 including hydrogen and CO, the zeolite membrane 140 of high adsorption affinity toward CO is used. For fuel cell applications, the removal of only the CO impurity as the permeate 1852 makes the membrane be operated at very high throughput.

Thus, an adsorptive diffusion separation mechanism is taught by the present invention. And the purge or sweep capability is important to operate the membrane effectively with this separation mechanism. Purification of hydrogen is achieved by selectively rejecting non-hydrogen molecules. This separation mechanism fully utilizes the selective adsorption function of zeolite materials. In a gas mixture stream 180 from catalytic reformer processes, hydrogen is typically a major component. Removing a minor component is more cost-effective than withdrawing the major one. For example, the reforming process of natural gas generates a typical gas mixture containing 79% $H_2$, 19% $CO_2$, 1% CO, and 1% un-converted $CH_4$ on the dry basis. A few percent of water vapor may also exist. Such a gas stream 180 can be purified by selectively rejecting $CO_2$, CO, and $CH_4$ gas, or selectively rejecting CO gas only. For PEM fuel cell applications, moisture is not harmful and does not necessarily need to be removed. Thus, zeolite materials of some hydrophobicity such as MFI-type zeolite of high silica/alumina ratio may be used. In order to enhance CO adsorption, the zeolite may be further modified by ion-exchange with metal ions. Zeolite materials can be modified by ion-exchange to become highly selective adsorbents for CO adsorption.

Separation results of reformer gas streams based on the adsorptive diffusion mechanism over the zeolite membrane have not been found in the open literature yet. However, there is overwhelming evidence to show the fundamental feasibility of present separation mechanism. For example, in $CO_2/N_2$ separation over the silicalite zeolite membrane, $CO_2$ consistently shows much higher permeance than $N_2$. It is expected that for $CO_2/H_2$ system, the separation selectivity of $CO_2$ to hydrogen at low temperatures could be much higher. With the adsorptive diffusion mechanism, the high separation selectivity correlates with the high adsorption selectivity of the zeolite material. Another example regarding the high selectivity of the zeolite membrane is the pervaporization separation of water/alcohol mixtures over the A-type zeolite membrane. A separation coefficient as high as 5,000–10,000 was reported.

Since the zeolite can be made as highly selective adsorbent. It is believed that high separation selectivity is achievable with the zeolite membrane. The zeolite membrane has the potential to selectively reject CO impurities from the reformer gas mixture. Based on the present separation mechanism, the permeate has large molecules relative to hydrogen. Thus, diffusional resistance through the substrate should not become a major factor. The module design of FIGS. 5 and 9 comprising alternate layers of feed and purge channels makes the diffusional length through the substrate matrix preferably small.

Hence, not only for purifying hydrogen, the inventive membrane support can be used for separating, purifying, filtrating, or other processing functions for a variety of gas-phase and liquid-phase mixtures through a plurality of tortuous paths 152 through the matrix of the porous body portion 150 having a membraned end 1521 and a non-membraned porous body end 1522. In general, the concept of tortuosity, is defined as the difference between the length of a flow path which a given portion of a mixture (gaseous or fluids) will travel through the passage formed by the channel as a result of changes in direction of the channel and/or changes in channel cross-sectional area versus the length of the path traveled by a similar portion of the mixture in a channel of the same overall length without changes in direction or cross-sectional area, in other words, a straight channel of unaltered cross-sectional area. The deviations from a straight or linear path, of course, result in a longer or more tortuous path and the greater the deviations from a linear path the longer the traveled path will be.

The inventive membrane module 150 for use in the device 10 has a simple structure that can be placed vertically as shown in FIG. 4, laid horizontally, as in FIGS. 4–13, in a slant, or aligned in any other position. Each of the feed flow channels 110 has a feed end 1101 and an exhaust end 1102. The membrane film 140 is supported and adapted to receive under a positive pressure gradient 170, an impure mixed feedstream 180 fed on the feed end 1101 of the plurality of feed flow channels 110. The membrane film 140 is adapted to process the impure mixed feedstream 180 into a purified permeate 1852 that is formed from a portion of the impure mixed feedstream 180 that passes through an outside surface of the membrane film 140 and into the plurality of tortuous paths 152 of the matrix of the body portion 150, entering the membraned end 1521 and exiting through the non-membraned porous body end 1522, as aided by the sweep or purge flow 280 from at least one purge conduit 210. A by product stream 1802 remains from a portion of the impure mixed feedstream 180 that does not pass through the membrane film 140 for exhausting through the exhaust end 1102 of the plurality of feed flow channels 110.

For a given separation process, the overall pressure difference or pressure gradient 170 between the feed and permeate side consists of a first pressure drop $\Delta P_{f,i}$ 171 across the membrane film 140 and coating layer 160, and a second pressure drop $\Delta P_{m,i}$ 172 through the support matrix 150, according to the following equation:

$$\Delta P_{overall} = P_{in} - P_{out} = \Delta P_{f,i} + \Delta P_{m,i}$$

The membrane flux increases with the pressure gradient 170 across the membrane film 140 and the optional coating layer 160:

$$J_i = k \cdot \Delta P_{f,i}$$

For a given separation process, $\Delta P_{overall}$ is fixed, but the pressure drop $\Delta P_{m,i}$ 172 through the support matrix 150 needs to be as small as possible:

$$\Delta P_{f,i} >> \Delta P_{m,i}$$

Only when the pressure drop 172 through the matrix, $\Delta P_{m,i}$, is small enough relative to the overall pressure drop 170, that the membraned channels 110 are fully utilized.

One critical problem for the usability of any membrane support is the performance of gas or liquid permeability through the matrix 150 and it becomes particularly critical for a multi-channel membrane module. In order to fully utilize the membrane surface area on the channel wall 114 of all the channels, resistance for a molecule, such as hydrogen gas, to permeate from the inner body 150 having the innermost channel 150 to the outside of the module 10 must be negligible relative to the resistance through the separation membrane 140. Otherwise, effectiveness of such a membrane module would be discounted.

$$\Delta P = L \cdot \frac{k \cdot V}{d_p^2} \cdot \frac{(1-\varepsilon)^2}{\varepsilon^3}$$

For a matrix of homogeneous pore structure, pressure drop is directly proportional to the fluid transport length, L, and flux/superficial linear velocity, V. The pressure drop decreases with increasing pore size, dp, and increasing with porosity, $\varepsilon$. Thus, the pore size and porosity are important parameters that affect the pressure drop through the matrix.

The high separation surface area with the present approach results from using small-size flow channels and a thin web thickness. The channel size in the conventional multiple-channel module is about 6 to 12 mm, much larger than the present design. Thus, the present invention teaches a membrane device including an inorganic or ceramic membrane module for mass transfer or exchange between two fluid streams. One fluid stream is a raw feed stream, while another one is sweep, purge or any other kind of a second fluid stream. The ceramic membrane module comprises one array of flow channels for the feed stream and another array of conduits or pathways for the sweep or second fluid stream. The feed flow channels are bonded and connected with the purge flow conduits by a porous solid matrix. The solid matrix provides the transport medium for a species to transport from the feed flow to the sweep flow, and also provides the mechanical strength for the module. The preferred pore size and porosity of the matrix material is 10 nm to 20 μm and 0.2 to 0.8, respectively. The feed flow channels and the second or sweep conduits are arranged in such a way that each feed flow channel can be accessed by the sweep flow or the second stream.

It will be apparent to those skilled in the art that various modifications and variations can be made to the present invention to include processing applications, such as sensors, without departing from the spirit and scope of the invention. Thus it is intended that the present invention cover the modifications and variations of this invention provided they come within the scope of the appended claims and their equivalents.

What is claimed is:

1. A multi-channel modular device for processing between two fluid streams of different compositions, the device comprising:
    a porous inorganic body having:
        a first plurality of feed-flow pathways disposed in the body for transporting a first stream;
        a pathway wall surrounding each of the first plurality of feed-flow pathways for processing the first stream into a first composition and a second composition;
        at least one feed-flow inlet disposed in the body for introducing the first stream into the first plurality of feed-flow pathways;
        at least one feed-flow outlet disposed in the body for discharging the remaining first stream containing the second composition;
        at least one second pathway disposed in the body for transporting a second stream having a second inlet and a second outlet; and a networked plurality of fluid conduits formed in the porous body in the form of interconnected pores of the porous body, providing a flow-conduit for sweeping the first composition from each of the first plurality of the feed-flow pathways to the second outlet; and a vessel for porting the inlets and outlets to provide a second stream flow access and for spacing the body within and away from the inner surfaces of the vessel to provide a gap for access; and a partition disposed in the gap between the body and the vessel for diverting the flow within the gap.

2. The device of claim 1, wherein the partition comprises a stream partition disposed in the gap between the body and the vessel for separating the feed stream from the second stream.

3. The device of claim 1, wherein the partition comprises a current partition disposed in the gap between the body and the vessel for selecting the relational direction between the streams, wherein the current partition separates an entrance portion of the second stream from the discharge portion of the second stream to direct the second stream for flowing in a direction countercurrent or co-current to the direction of the feed stream.

4. The device of claim 1, wherein the porous body is extruded from a stable ceramic material selected from a member of the inorganic refractory and ductile metal oxides group consisting of alumina ($Al_2O_3$), mullite ($3Al_2O_3$-$2SiO_2$), silica ($SiO_2$), silicon carbide (SiC), cordierite ($2MgO$-$2Al_2O_3$-$5SiO_2$), glasses, and alumina-silica mixture.

5. The device of claim 1, further comprising a membrane film deposited on the inner surface of each of the pathway walls of the first plurality of feed-flow pathways for processing the feed stream into the first composition being a permeate and the second composition being a retentate.

6. The device of claim 5, wherein the membrane film is made from an organic, an inorganic, or a composite organic/inorganic material.

7. The device of claim 5, wherein the membrane film is made from a material selected from a member of the group consisting of palladium (Pd), palladium-alloy, Pd—Ag, Pd—Cu, zeolite, alumina, zirconia, silica, SiC, glass, and polymer.

8. The device of claim 7, wherein the membrane film is a zeolite material.

9. The device of claim 1, wherein the porous body has a ceramic monolithic support matrix having interconnected pores with interstices connecting the pores such that more than 20% of the total pore volume has a pore size in a range about 10 nm to 20 um.

10. The device of claim 9, wherein the porosity of the ceramic monolithic support matrix is in a range of about 20–80%.

11. The device of claim 1, wherein the pathway wall surrounding each of the first plurality of feed-flow pathways define a channel hydraulic diameter in a range of about 0.2 to 5 mm.

12. The device of claim 1, wherein the first plurality of feed-flow pathways each having a channel hydraulic diameter in a range about 0.2–5 mm, the feed-flow pathways are distributed in a channel density of about 10 to 1000 cpsi and having a percent open frontal area (OFA) in a range about 20–80%.

13. The device of claim 9, wherein
the porous body comprises a ceramic monolithic multi-channel module support having a module hydraulic diameter in a range about 9 to 100 mm, an aspect ratio of the module hydraulic diameter to a module length greater than 1;

the first plurality of feed-flow pathways are distributed substantially in parallel over a module cross-section and about the at least one purge channel, the first plurality of feed-flow pathways having a size and shape defining a channel density in the range of about 50–800 channels/in$^2$ (7.8–124 channels/cm$^2$) in a module frontal area, a channel hydraulic diameter in the range of about 0.5–3 mm, a rim distance having a thickness greater than 1.0 mm (0.04 in), and a percent open frontal area (OFA) in the range of about 20–80%; and the at least one second pathway comprises a purge channel having a hydraulic diameter in a range about 1 to 10 mm, disposed in the center of the body for introducing and radially distributing the second stream from the second inlet to the networked plurality of fluid conduits comprising the interconnected pores in the body for sweeping the first composition from each of the first plurality of feed-flow pathways to the exterior surface of the body being discharged through the second outlet, the interconnected pores in the body having a porosity of about 20 to 80% and more than 20% of the pore volume having a pore size in the range of about 0.2 to 25 um.

14. The device of claim 12, wherein the at least one second pathway comprises a second plurality of purge conduits, each having a channel conduit hydraulic diameter in a range about 0.2–10 mm, the second plurality of purge conduits are distributed in a channel density of about 10 to 1000 cpsi and having a percent open frontal area (OFA) in a range about 20–80%, the first plurality of feed-flow pathways overlapping the second plurality of purge conduits in at least one point, at an overlapping angle ranging from zero degrees to ninety degrees, and the pathway wall between the first plurality of feed-flow pathways and the second plurality of purge conduits having a thickness greater than 0.5 mm.

15. The device of claim 14, wherein the overlapping angle is zero degrees and the second plurality of purge conduits are aligned parallel with the first plurality of feed-flow pathways and being plugged at both ends of the second plurality of purge conduits, and the second inlet and second outlet comprise at least one aperture coupled in the body on opposing sides perpendicular to the plugged openings for transporting the second stream from the second inlet aperture into the second plurality of purge conduits in the body, and discharging a purge flow mixture from the second plurality of purge conduits in the body to the second outlet aperture.

16. The device of claim 14, wherein the overlapping angle is ninety degrees and the second plurality of purge conduits are aligned perpendicularly with the first plurality of feed-flow pathways having opened opposed feed ends and open opposed sweep ends for providing the second plurality of purge conduits in the body on opposing sides perpendicular to the opened opposed feed ends for axially transporting the sweep stream having the second inlet and the second outlet through the open opposed sweep ends.

17. The device of claim 8, wherein the zeolite material is a layer of adsorbent film used for a continuous adsorption process and operated at a pressure differential between the feed and second fluid stream from about 1 to 50 bar and at a temperature from about 0° C. to 700° C.

18. The device of claim 8, wherein the zeolite material is a layer of adsorbent film used for purification of a hydrogen gas mixture wherein non-hydrogen impurities contained in the feed stream comprising a feed gas are adsorbed on the zeolite adsorbent film deposited on the pathway walls of the feed-flow pathways, diffuse through the zeolite adsorbent film and through the networked plurality of fluid conduits formed in the porous body and into the at least one second pathway, and are swept away by the second stream comprising a sweep gas stream at a pressure differential between the feed and sweep streams from about 1 to 50 bar and at a temperature from about 0° C. to 150° C.

19. The device of claim 1 is used for a continuous absorption where the feed is gas-phase fluid and second stream is liquid-phase fluid, at a pressure differential between the feed and second streams from about zero to about 2 bar, and at a temperature from 0° C. to 200° C.

20. The device of claim 3, wherein the ratio of the second stream volume rate to the feed stream volume rate is less than 10 and the relational direction between the streams is countercurrent, wherein the second stream flows in a direction countercurrent to the feed stream.

21. The device of claim 1 is used for a continuous extraction process in a liquid system where the first stream is a raffinate and the second stream is an extract for operation at a temperature from 0° C. to 300° C.

22. The device of claim 1 is used for a continuous mixing process at a pressure differential between the first and second streams from about zero to about 10 bar, and at a temperature from 0° C. to 300° C.

23. A multi-channel modular device for processing between two fluid streams of different compositions, the device comprising:
  a porous inorganic body having:
    a first plurality of feed-flow pathways disposed in the body for transporting a first stream;
    a pathway wall surrounding each of the first plurality of feed-flow pathways for processing the first stream into a first composition and a second composition;
    at least one feed-flow inlet disposed in the body for introducing the first stream into the first plurality of feed-flow pathways;
    at least one feed-flow outlet disposed in the body for discharging the remaining first stream containing the second composition;
    at least one second pathway disposed in the body for transporting a second stream having a second inlet and a second outlet; and
    a networked plurality of fluid conduits formed in the porous body for sweeping the first composition from each of the first plurality of the feed-flow pathways to the second outlet; and
  a vessel for porting the inlets and outlets to provide a second stream flow access and for spacing the body within and away from the inner surfaces of the vessel to provide a gap for access; and
  a partition disposed in the gap between the body and the vessel for diverting the flow within the gap,
wherein the porous body comprises a ceramic monolithic multi-channel module support having a module hydraulic diameter in a range about 9 to 100 mm, an aspect ratio of the module hydraulic diameter to a module length greater than 1 and the first plurality of feed-flow pathways are distributed substantially in parallel over a module cross-section and about the at least one purge channel, the first plurality of feed-flow pathways having a size and shape defining a channel density in the range of about 50–800 channels/in$^2$ (7.8–124 channels/cm$^2$) in a module frontal area, a channel hydraulic diameter in the range of about 0.5–3 mm, a rim distance having a thickness greater than 1.0 mm (0.04 in), and a percent open frontal area (OFA) in the range of about 20–80%, and wherein the at least one second pathway comprises a purge channel having a hydraulic diameter in a range about 1 to 10 mm, disposed in the center of the body for introducing and radially distributing the second stream from the second inlet to the networked plurality of fluid conduits comprising the interconnected pores in the body for sweeping the first composition from each of the first plurality of feed-flow pathways to the exterior surface of the body being discharged through the second outlet, the interconnected pores in the body having a porosity of about 20 to 80% and more than 20% of the pore volume having a pore size in the range of about 0.2 to 25 um.

* * * * *